United States Patent
Reifenhäuser et al.

(10) Patent No.: US 9,337,655 B2
(45) Date of Patent: May 10, 2016

(54) METHOD AND DEVICE FOR THE DIRECTIONAL TRANSMISSION OF ELECTRICAL ENERGY IN AN ELECTRICITY GRID

(75) Inventors: Bernd Reifenhäuser, Mainz (DE); Alexander Ebbes, Nieder-Olm (DE)

(73) Assignee: GIP AG, Mainz (DE)

( * ) Notice: Subject to any disclaimer, the term of this patent is extended or adjusted under 35 U.S.C. 154(b) by 762 days.

(21) Appl. No.: 13/320,329

(22) PCT Filed: May 5, 2010

(86) PCT No.: PCT/EP2010/056114
§ 371 (c)(1),
(2), (4) Date: Nov. 14, 2011

(87) PCT Pub. No.: WO2010/130615
PCT Pub. Date: Nov. 18, 2010

(65) Prior Publication Data
US 2012/0059532 A1     Mar. 8, 2012

(30) Foreign Application Priority Data

May 15, 2009 (DE) .......................... 10 2009 003 173

(51) Int. Cl.
*H02J 3/14* (2006.01)
*H02J 3/00* (2006.01)
*H02J 13/00* (2006.01)

(52) U.S. Cl.
CPC ... *H02J 3/00* (2013.01); *H02J 3/14* (2013.01); *H02J 13/0017* (2013.01); *Y02B 70/3225* (2013.01); *Y04S 20/222* (2013.01)

(58) Field of Classification Search
CPC .............. H02J 3/14; H02J 17/00; H02J 3/00; H02J 3/0017; G06Q 50/06; Y04S 20/222; Y02B 70/3225; G06F 11/3062; G06F 1/266; H04L 12/10; H04L 12/40045
USPC ........... 340/538, 538.15, 12.32, 12.37, 13.23; 700/286–297; 370/351; 307/31–42
See application file for complete search history.

(56) References Cited

U.S. PATENT DOCUMENTS

| | | |
|---|---|---|
| 6,055,163 A | 4/2000 | Wagner et al. |
| 6,792,259 B1 | 9/2004 | Parise |

(Continued)

FOREIGN PATENT DOCUMENTS

| | | |
|---|---|---|
| DE | 10120515 A1 | 11/2002 |
| DE | 102006043831 A1 | 3/2008 |

(Continued)

OTHER PUBLICATIONS

Saitoh et al., "A New Electric Power Network for Effective Transportation of Small Power of Dispersed Generation Plants," Electrical Engineering in Japan, vol. 117, No. 1 (11 pages) (1996).
International Search Report (PCT/EP2010/056114) Nov. 14, 2011 (3 pages).
German Search Report (10 2009 003 173.1) Mar. 10, 2010 (4 pages).

(Continued)

*Primary Examiner* — James Yang
*Assistant Examiner* — Laura Nguyen
(74) *Attorney, Agent, or Firm* — The Maxham Firm

(57) ABSTRACT

A method for the directional transmission of electrical energy in an electricity grid and to a method for transmitting electrical energy via an electricity grid having at least at least one generator for electrical energy, at least one network node and at least one consumer. A method and a system are provided for transmitting electrical energy, which method and system are highly flexible and make it possible to design the energy distribution in a grid dynamically so as to deal with even short-term fluctuations both on the supply side and on the demand side. A method for the directional transmission of electrical energy in an electricity grid is included, which method comprises the following steps: receiving a data packet, receiving an energy packet associated with the data packet, determining a receiver from the information contained in the data packet, transmitting the data packet to the previously determined receiver and transmitting the energy packet, which is defined by the voltage U(t), the electric current I(t) and the duration T of the packet, associated with the data packet to the same previously determined receiver.

21 Claims, 18 Drawing Sheets

(56) References Cited

U.S. PATENT DOCUMENTS

| | | |
|---|---|---|
| 6,900,556 B2 | 5/2005 | Provanzana et al. |
| 7,068,991 B2 | 6/2006 | Parise |
| 7,075,194 B2 | 7/2006 | Weidenheimer et al. |
| 7,893,561 B2 | 2/2011 | Weidenheimer et al. |
| 2004/0142733 A1* | 7/2004 | Parise .......................... 455/572 |
| 2006/0249318 A1 | 11/2006 | Weidenheimer et al. |
| 2007/0055636 A1 | 3/2007 | Chambers et al. |
| 2008/0219186 A1 | 9/2008 | Bell et al. |
| 2008/0219239 A1* | 9/2008 | Bell et al. ....................... 370/351 |
| 2008/0316916 A1* | 12/2008 | Tazzari et al. .................. 370/216 |
| 2010/0007219 A1* | 1/2010 | de Buda et al. ............... 307/149 |
| 2010/0306097 A1 | 12/2010 | Greiner et al. |
| 2011/0140526 A1 | 6/2011 | Weidenheimer et al. |
| 2011/0264935 A1* | 10/2011 | Shetty et al. .................. 713/320 |
| 2014/0013146 A1* | 1/2014 | Kreiner et al. ................ 713/340 |

FOREIGN PATENT DOCUMENTS

| | | |
|---|---|---|
| WO | 0101542 A1 | 1/2001 |
| WO | 0231954 A1 | 4/2002 |
| WO | 2010057947 A2 | 5/2010 |

OTHER PUBLICATIONS

Chinese Search Report (application No. 201080022008.8) 2 pages (Aug. 26, 2013).

Toyoda J. et al.: "Proposal of an open-electric-energy-network (OEEN) to realize cooperative operations of IOU and IPP"; Proceedings of EMPD-98. 1998 International Conference in Singapore Mar. 3-5, 1998, IEEE, US vol. 1, pp. 218-222 (Mar. 3, 1998).

EPO Official Action dated May 7, 2014, 9 pgs. (corresponding EPO serial No. 10 717 645.5).

* cited by examiner

Fig. 8

```
INVITE sips:power@rwe.smartgrid.de SIP/2.0
From: "Michael Mueller"
  <sips:michael.mueller@mainz.smartgrid.de>;tag=9fxced76s1
To: "RWE" <sips:power@rwe.smartgrid.de>
Call-ID: ab-cid
Cseq: 1 INVITE
...
<smartgridRequest>
          <requester>
            <name>Michael Mueller</name>
            <connection>0x12345678ABCD</connection>
          </requester>
          <request>
            <amount value="4 kwh"/>
            <condition value="regenerative"/>
            <price valueMax="0.18 Euro">
            <timeSchedule>
                      valueMin="now" valueMax="+04:00 h"
            />
          </request>

</smartgridRequest>
```

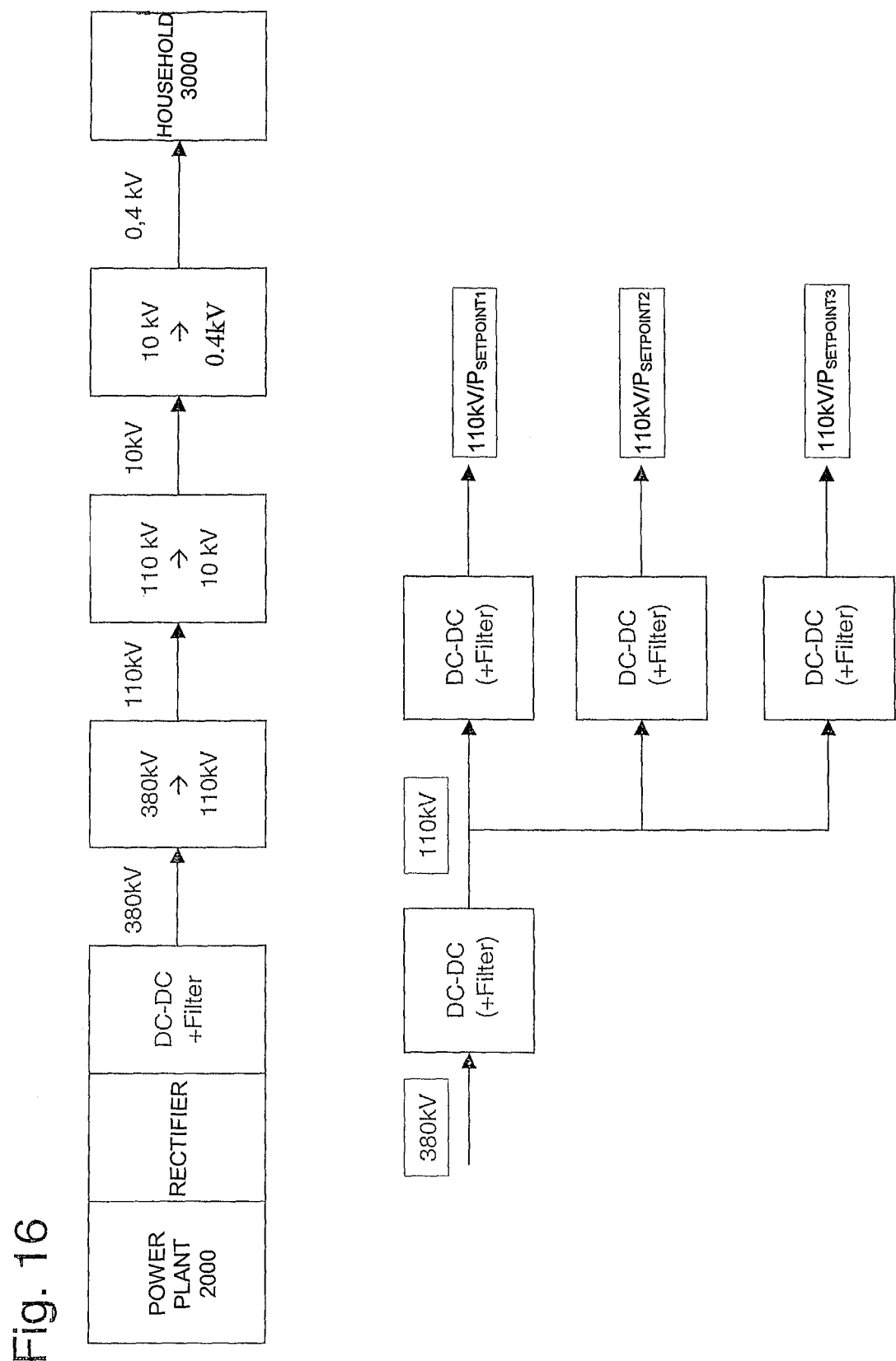

METHOD AND DEVICE FOR THE DIRECTIONAL TRANSMISSION OF ELECTRICAL ENERGY IN AN ELECTRICITY GRID

The present invention relates to a method for the directional transmission of electrical energy in an electricity grid and to a method for the transmission of electrical energy via an electricity grid comprising at least one generator for electrical energy, at least one network node and at least one consumer.

The present invention further relates to a network node for the directional transmission of electrical energy in an electricity grid and to an electricity grid comprising at least one generator for electrical energy, at least one network node and at least one consumer.

Known electricity grids ensure the supply of the individual users or consumers by a static switching of the network. The network is switched in such a way that it connects one or more consumers, via a number of intermediate stations, to an energy generator, for example a large power plant or a decentralised system for the generation of renewable energy, for example a wind turbine.

The switching of such a grid may be changed during operation by a central controller in such a way that more or fewer consumers can be connected to a single energy generator or else the number of energy generators connected to the grid can be varied. Furthermore, the energy generators can vary their power or energy fed into the grid.

Such centrally controlled and permanently connected grids can only ensure a permanent power supply to all consumers since they permanently provide a surplus supply, i.e. more energy than the actual demand of the consumers. Although this surplus supply can be adapted roughly to the known requirements of the consumers with the aid of prognosis models, it has been found that these electricity grids do not meet demands and are inflexible and inefficient.

Demand-oriented methods and systems for transmitting electrical energy are also already known from the prior art. What is common to them all is that as well as being able to transmit energy between the energy generators and the energy consumers, they also enable communication between the consumers and the generators and thus make it possible to transmit the actual demand of the consumers to the generators and to adapt the generation of power to the current demand. Such systems are known as "smart grid" systems.

These currently proposed smart grids provide only centrally controlled grids which do not allow the energy generated on the generator side to react to changes, in particular to short-term fluctuations, without prognostic methods. Particularly when the proportion of renewable energy increases, however, there are considerable fluctuations on the supply side. For example, the amount of energy provided by a wind farm thus depends on the current wind conditions. The amount of energy available is therefore highly volatile. For example, during a lull energy must be provided from other energy generators in the short term in order to satisfy demand.

An object of the present invention is therefore to provide a method and a system for the transmission of electrical energy, which method and system are highly flexible and make it possible to design the energy distribution in a grid dynamically so as to deal with even short-term fluctuations both on the supply side and on the demand side.

A further object of the present invention is to provide a method and a system for the transmission of electrical energy, which method and system do without a central, overriding controller or control unit.

A further object of the present invention is to provide a method and a system for the transmission of electrical energy, which method and system allow consumers of electrical energy to purchase the energy under conditions in line with market requirements.

At least one of the aforementioned objects is achieved by a method for the directional transmission of electrical energy in an electricity grid, which method comprises the following steps: receiving a data packet, receiving an energy packet associated with the data packet, determining a receiver from the information contained in the data packet, transmitting the data packet to the previously determined receiver and transmitting the energy packet, which is defined by the voltage $U(t)$, the electric current $I(t)$ and the duration T of the packet, associated with the data packet to the same previously determined receiver.

The individual steps may be implemented chronologically one after the other (sequentially) or else in parallel.

The method according to the invention allows a flexible transmission of electrical energy from a generator, via an electricity grid comprising one or more network nodes, to a consumer.

The method according to the invention for directional energy transmission will be referred to hereinafter as "smart grid routing" or "routing" of the electrical energy for short.

In contrast to the prior art, the energy is transmitted not by the provision of a static network line from a power plant to a consumer and by the subsequent switching on of a consumer device and thus an energy transmission, i.e. of the current flow in the vicinity of the active consumption, but instead in the form of energy packets which are dynamically routed to the network nodes.

Within the meaning of the present application, 'routing' means that, as is the case in packet-switched Internet, the route from the generator to the consumer has to be determined for each transmission of a packet. For this purpose, in one embodiment, the route or path is established by means of the known route-finding or routing algorithms.

Such a packet-based energy transmission exhibits a similarity to packet-based information transmission, wherein the information to be transmitted in a data network as a payload is replaced, at least in part, by the energy packet to be transmitted.

Within the meaning of the present invention an energy packet is electrical energy in an amount and at a voltage which is sufficient, at the consumer end, to operate an electrical device, in particular a domestic object or lighting. The transmission of electrical energy is to be distinguished from the transmission purely of information. The energy packet preferably has a direct voltage or an alternating voltage of at least 20 volts on average, preferably at least 50 volts on average of direct voltage and at least 100 V on average of alternating voltage.

In order to make such dynamic routing possible, a data packet is associated with the energy packet and is transmitted to the same receiver as the data packet and contains the information necessary for the routing. Preferably at least one, but particularly preferably precisely only one, data packet is associated with each energy packet.

On the basis of the information contained in the data packet, the receiver to which the data packet and the energy packet have to be transmitted is determined during the routing of said data packet. Within the meaning of the present application, the receiver is understood to be the next element in the network. This may be a network node or a consumer.

In order to enable a routing of the energy packet, in one embodiment the data packet associated with the energy packet comprises an unique addressing of the generator of the energy packet. In a further embodiment the data packet comprises an unique addressing of the consumer of the energy packet, also referred to hereinafter as a target address. Both the origin and the target of a respective energy packet can thus be defined, whereby a routing to the individual participating elements of a network is possible.

In one embodiment the data packet comprises a header data region in which the addressings of the generator and/or consumer are preferably contained.

The next receiver within the network is determined for example by reading out the addressing of the consumer indicated in the data packet and looking up the next receiver in a stored routing table.

In one embodiment the generator in the grid or, more generally, a supply node establishes a path for the respective energy packet through the network and preferably transmits a path table in the data packet which is associated with the energy packet to be transmitted.

The routing according to the invention preferably occurs in a network node of the network. Within the meaning of the present invention, at least in one embodiment, the generator and the consumer are also particular denoted network nodes. They form the start and end of a network connection.

In one embodiment the data packet defines not only the amount of energy of the energy packet associated therewith, but also a power profile, i.e. the amount of energy to be provided for the packet per unit of time.

In such an embodiment of the method the amount of energy is requested or ordered via the indication of a power profile, i.e. a specification regarding which power is to be provided maximally at which time.

In one embodiment this power profile determines the course over time of the maximum power provided by an energy packet, i.e. the course over time of the voltage $U(t)$ and/or of the electric current $I(t)$ and optionally the duration T of the energy packet to be transmitted.

In a further embodiment the method according to the invention therefore further comprises the following steps: determining a power profile $TP(t)$ for the energy packet to be transmitted, wherein the power profile determines which power is to be maximally transmitted for the energy packet at a moment in time t, and transmitting an energy packet having the determined power profile $TP(t)$.

In one embodiment the power profile $TP(t)$ is marked on the energy packet to be transferred in that a power valve is controlled at the output of the network node in such a way that at no time can a power exceeding the setpoint power defined by the power profile for this moment in time be transmitted.

Furthermore, in one embodiment the power profile $TP(t)$ is transmitted to the receiver as information with the data packet which is associated with the energy packet to be transmitted.

In the simplest case, in which only a single energy packet is received at any time and this energy packet is to be transmitted via a single line, the power profile $TP(t)$ (also referred to hereinafter as the transport profile) for the energy packet (also referred to hereinafter as the transport packet) to be transmitted is identical to the power profile of the energy packet received.

It is expedient if, in one embodiment, the method further comprises the following steps: selecting a line for the transmission of the energy packet with the aid of the information contained in the data packet, disconnecting the selected line with the aid of a controllable switch, controlling the power transmitted at a moment in time t, with the aid of the controllable switch, on the basis of the power profile $TP(t)$ of the energy packet to be transmitted.

In more complex situations two or more energy packets, which are to be transmitted via the same line, preferably simultaneously, are received by one network node.

The method according to the invention therefore preferably further comprises the following steps: combining a plurality of received energy packets to form one energy packet or transport packet to be transmitted, wherein each of the received energy packets comprises a power profile $P(t)$ which determines which maximum power the energy packet provides at a moment in time t, wherein during this combining process the power profiles $P(t)$ of the received energy packets are added to a power profile $TP(t)$ or transport profile of the energy packet or transport packet to be transmitted, and transmitting to the receiver the target addresses and the power profiles $P(t)$ of the received energy packets in a data packet associated with the energy packet to be transmitted.

On the other hand, received energy packets which contain a plurality of energy packets have to be separated, for example at a network node, and forwarded on or transmitted to different receivers. It is therefore expedient if, in one embodiment, the method according to the invention comprises the following steps: breaking down a received energy packet into a plurality of energy packets to be transmitted, the data packet associated with the received energy packet containing information regarding the target addresses and the power profiles of the energy packets to be transmitted, transmitting each of the energy packets to be transmitted with the power profiles associated therewith to a respective receiver, and transmitting the data packets, which are associated with the energy packets to be transmitted, to the same receivers as the energy packets.

If, within the meaning of the present application, it is mentioned that the data packet associated with the energy packet is transmitted with the energy packet, or the energy packet is transmitted to the same receiver as the data packet, this is to be understood to mean that the data packet and the energy packet travel the same route in the network on the way from the generator to the consumer, since the data packet contains the information required for the routing of the energy packet to the individual network nodes.

Within the meaning of the present application, a transmission of the data packet and of the energy packet may mean that both the data packet and the energy packet are transmitted over the same physical network, i.e. an identical line. In such an embodiment the data network for the data packet is a "power line network", in which, for the transmission of information, the data packet is modulated onto the current to be transmitted for energy supply. The technology required for this is well known from the prior art as a carrier frequency system for data transmission via power grids.

In an alternative embodiment the energy and data packets are transmitted at least between the individual network nodes via physically separate networks, i.e. for example via at least two different lines—a line and a radio link or a line and a further transmission channel. In one embodiment all connections between the elements of the network, i.e. generators, network nodes and consumers are formed twice—once as an electricity grid for transmission of the energy packets and once as a data network for transmission of the data packets associated with the energy packets.

However, in such an embodiment with separate physical networks, the data and energy packets are also expediently transmitted in the same logical network, which comprises a transport plane and a signalling and control plane (SCP). The energy packet is preferably transmitted in the transport plane.

In one embodiment of the invention the data packets are transmitted using IP technology, which uses the well-known Internet protocol for data transmission. In accordance with the Internet protocol the unique addressing of the generator and/or the consumer of the energy packet would be contained in a data packet in the header data region (IP header).

In one embodiment of the invention the routing is carried out autonomously, i.e. without an overriding central controller. For example, during routing the decision regarding the receiver to which the energy packet is to be transmitted next is made on the basis of routing tables depending on the addressing of the consumer. However, other routing algorithms are also alternatively suitable for path determination.

In a further embodiment of the invention the routing is carried out in a self-organised manner, i.e. within the meaning of the present application changes to the network, for example the addition or removal of network nodes or the addition or removal of connections between network nodes are detected by the system itself, without the need for an overriding unit, such as a central server or the like. Local rules, i.e. those to be applied in the individual network nodes, establish global structures for both the control and transport planes.

In one embodiment the routing according to the invention may further comprise the step that the duration T of the energy packet to be transmitted is determined, i.e. how much energy is contained in the packet. The duration of the energy packet is preferably an integral multiple of the duration dt of a basic energy frame.

The duration of an energy packet on its way through the grid may change from the generator to a consumer.

A plurality of energy packets may be combined during transport through the network, or a packet may be broken down during transport into a plurality of smaller packets.

On the one hand, a large energy packet can be divided into a plurality of small packets. With this in mind a large energy packet preferably consists of an integral multiple of a virtual basic energy frame which has a constant amount of energy over all voltage levels of the grid. The large energy packet can then be divided at a network node into a plurality of smaller energy packets, wherein each of the smaller energy packets in turn consists of an integral multiple of virtual basic energy frames. For example, a large energy packet is provided by a large power plant over a high voltage network and is divided at a network node into a plurality of smaller energy packets, of which the total energy corresponds to the energy of the original energy packet.

However, the packets provided by different generators may also be combined at a network node for transmission of a single packet, also referred to as a transport packet, wherein the power profiles belonging to the individual packets are added together in order to generate a power profile for the energy packet to be transmitted from this network node. Owing to the parallel transmission of information regarding the individual power profiles of the combined energy packets and the target addresses of the individual packets, the transport packet can be broken down again at the target node thereof into the individual packets which can then be routed further to their respective target addresses.

A further change to the duration of an energy packet or the power profile thereof occurs during the transition between the voltage levels of the electricity grid. Since the amount of energy of the packet remains substantially constant during the step down, the change in voltage (at constant current) leads to an extension of the duration of the packet.

At least one of the aforementioned objects is also achieved by a method for the transmission of electrical energy via an electricity grid comprising at least one generator for electrical energy, at least one network node and at least one consumer, wherein the electrical energy is transmitted in the form of at least one energy packet from the generator, via the network node to the consumer, wherein a data packet is associated with the energy packet and is transmitted with the energy packet, and wherein the energy packet is routed to the network node using the method for directional transmission of electrical energy, as described above.

The data packet associated with the energy packet does not necessarily have to be transmitted at the same time as the energy packet, but instead a delay between the two packets is possible, if not even desirable in some embodiments.

In particular, in one embodiment of the invention the data packet may precede the respective energy packet in order to trigger the necessary switching in the router for the energy packet before it arrives at the respective network node. In other words, in such an embodiment the route for transmission of the respective energy packet is formed before the energy packet arrives at the individual participating network nodes.

In one embodiment of the method according to the invention a data packet is also transmitted from a consumer to a network node or a generator. Such a data packet may contain different information, for example a request for the provision of an energy packet from the generator to the consumer, a "handshake" after the transmission of an energy packet from the generator to the consumer, or else information for negotiating a price at which the energy packet is to be provided. A bidirectional communication between the individual elements of the network is thus enabled. The data packets can be transmitted over the same network as the data packets associated with the energy packets, but in the direction opposite that of transmission of the energy packets, or alternatively also via a separate data network, for example a radio network, in particular also via the Internet.

In a further embodiment, in addition to the data packets which are associated with an energy packet, further data packets may also be transmitted from the energy generator to the consumer and are used exclusively for data communication between generator and consumer, without also transmitting energy packets therewith.

In one embodiment the method according to the invention has a power limit which prevents a consumer from taking more power than it requested. The upper limit of power at any moment is defined by the power profile of the packet. This is different from conventional networks, in which a consumer draws as much power from the network as it requires at that moment.

In one embodiment such a power limit implies the assumption that in actual fact all energy packets provided are also received by the consumer that requested them. The implementation of this assumption generally implies the provision of energy stores on the consumer side. In a first embodiment the power provided to the consumer is obtained by stepping down the voltage using corresponding regulators, which are also referred to as power valves, on the line of the consumer when the power requested for a specific time period has been reached.

Alternatively, a power limit can also be achieved by a time multiplex of the energy packets, such that the consumer merely indicates how much energy, i.e. how many energy packets, it wants to receive in total. If the number of energy packets to be supplied is reached, the supply of packets is thus terminated.

At least one of the aforementioned objects is also achieved by a network node for the directional transmission of electrical energy in an electricity grid, comprising a receiving device for receiving a data packet, a receiving device for receiving an energy packet associated with the data packet, a device for determining a receiver from the information contained in the data packet, a device for transmitting the data packet to the previously determined receiver, wherein the device for transmitting the data packet is connected to the device for determining the receiver, a device for transmitting the energy packet associated with the data packet, which energy packet is defined by the voltage U(t), the electric current I(t) and the duration T of the packet, wherein the device for transmitting the energy packet is connected to the device for determining the receiver, wherein the network node is designed in such a way that it transmits the data packet and the energy packet to the same receiver during operation.

In this way the network node can use the target address of the data packet both for the directional transmission, i.e. routing of the data packet, and for the directional transmission, i.e. routing of the energy packet.

In one embodiment the device for determining the receiver is a device for determining the route or path for the data packet through a data network and for determining the route or path for the energy packet through a power network.

In particular, the network node has a device for power control for the transport of the energy packet so that the energy packet is transmitted in the time T.

Such a network node according to the invention will therefore be referred to hereinafter as a smart grid router (SGR for short) or as a router for short.

Such a router is expediently arranged in a network node and/or a generator and/or a consumer of a grid.

In a preferred embodiment of the router according to the invention the device for transmitting the energy packet and the device for transmitting the data packet associated with the energy packet are connected to two physically different networks.

In one embodiment of the invention, in addition to the electricity grid, a data network parallel thereto is assigned for this purpose and these preferably together form a logical network.

In a further embodiment the logical network formed of the grid and data network comprises a transport plane and a signalling and control plane (SCP). These two planes are also formed in the router according to the invention.

In one embodiment the transport plane of the network is split into two physical networks. The electrical energy to be supplied from the generator to the consumer is transmitted via a first network, whereas the necessary data communication takes place with data packets via the second network between the elements of the network, preferably in a bidirectional manner. The signalling and control plane communicates via the data network.

In a preferred embodiment the signalling and control plane is preferably formed with a next generation network (NGN), preferably with an IP network. SIP (session initiated protocol) may preferably be used as a signalling protocol in the signalling and control plane, for example as specified in RFC 3261.

The physical transmission path is considered to be a physical network within the meaning of the present application, as well as being established as a bit-transmission layer as layer 1 in the OSI layer model.

In one embodiment the device for transmitting the energy packet comprises a controllable switch, which is also referred to as a power valve and is connected to the device for transmitting the data packet in such a way that it can be controlled thereby. An example of such a switch is a GTO thyristor.

An energy packet is expediently transmitted between two nodes in that the connecting line between the nodes is disconnected from both nodes or from the power valves of both nodes and the current flowing via this line is controlled by at least one of the power valves.

At least one of the aforementioned objects is also achieved by an electricity grid comprising at least one generator for electrical energy, at least one network node and at least one consumer, wherein the generator, the network node and the consumer are designed and interconnected in such a way that, during operation, electrical energy can be transmitted in the form of at least one energy packet having a predetermined amount of energy from the generator, via the network node to the consumer, wherein the generator, the network node and the consumer are designed and interconnected in such a way that, during operation, a data packet associated with the energy packet can be transmitted from the generator, via the network node to the consumer, wherein the network node comprises a network node according to the invention for directional transmission of the energy packet with use of the data packet, as described above.

In one embodiment of the invention the generator and/or the consumer also each comprise a device for transmitting an energy packet.

In a further embodiment at least the consumer and/or the network node comprise a device for receiving an energy packet.

However, in a further embodiment the consumer also comprises a device for transmitting a data packet, such that a bidirectional communication is provided between the individual elements of the network.

In a preferred embodiment of the invention the generator, the network node and/or consumer comprise a store for electrical energy. Such an energy store makes it possible in particular for the consumer to buy energy packets if these are offered on the market for a convenient price, for example if the total consumption within the grid is low (for example at night) or if the supply in the grid is high (for example in Autumn).

Depending on the demand profile, different types of accumulators or batteries or else other stores for electrical energy can be used as energy stores in the service connections. In the embodiment illustrated the battery is a battery based on lithium-ion technology. However, lead accumulators are also conceivable, as are conventionally used to store large amounts of energy. Accumulators based on lithium-iron-phosphate oxide, lithium-nickel-cobalt oxide, lithium-nitrate oxide, lithium oxide, nickel oxide, cobalt oxide, and aluminium oxide as well as lithium manganese oxide and lithium titanium oxide technology are also suitable. Embodiments of accumulators comprising anodes made of nanostructured material such as lithium titanate are also conceivable.

As an alternative to accumulators, capacitors of high capacitance, such as high-caps, super-caps or ultra-caps, for example made of carbon nanotubes or capacitive polymers can also be used. For example, further energy stores comprise superconductive coils, superconductive magnetic energy stores (SMES), flywheels or other mechanical systems for conversion into kinetic energy, water storage power plants, pumped storage power plants for conversion into potential energy, hydrogen stores formed of elements for cleaving water into hydrogen and oxygen in conjunction with fuel cells, or more generally systems for storing thermal energy, chemical energy, mechanical or electrical energy. The aforementioned energy stores are in principle not only adapted for energy storage on the consumer side, but also on the power plant side or in the individual network nodes.

In one embodiment the energy store may be a mobile energy store, for example as is provided in electrically driven motor vehicles. Such mobile energy stores are connected to the grid for charging and can be used in particular for energy storage on the consumer side. In particular this is suitable because most motor vehicles remain unused and parked for approximately 80% of their service life.

The use of energy stores cancels out the clear differentiation between energy generators and consumers. Any device which has energy, for example from an energy store, can also in principle feed this into the network and thus become a "generator". On the other hand, any energy store, for example including an energy store associated with a power plant, can receive electrical energy from the network and thus become a consumer. The terms "generator" and "consumer" used in the present application are thus to be understood in the broader sense as energy sources and energy sinks in the grid.

In one embodiment a consumer comprises a store management for the energy store associated therewith. The store management can define one or more characteristic levels which are predetermined either automatically or by the operator of the consumer and can trigger the specific processes. For example, the store management may trigger a request for the supply of a specific amount of energy once a specific level has been reached, or else offer a specific amount of energy for feeding to the network, for example if there is a risk of the store overflowing. In one embodiment the store management triggers an energy request, in particular if a minimum level of the energy store is reached, wherein for example energy is bought irrespectively of the price offered. The store management can also define the power profiles in accordance with predeterminable rules. If a store comprising the above-described store management is associated with each network node or SGR, the power profiles can thus expediently be determined in a self-organising manner.

In one embodiment a network node of the grid forms a virtual power plant, wherein this network node is connected to a plurality of generators and appears to the consumers as a single generator.

In order to better understand the terminology used in the description above and the basic elements of the network according to the invention, the route of the electrical energy generated in a power plant from the energy generator or power plant, via a single network node to a single end consumer, for example a private household, will be described hereinafter.

It is assumed that in the private household laundry is to be washed on a weekday and the washing machine available can be programmed in terms of time such that it can be operated at a time when excess electrical energy is generated and therefore the prices are favourable. The programming of the washing machine to an appropriate operating time means that the router of the consumer, which comprises a data connection to the washing machine, sends a data packet with a request for the supply of electrical energy with a power profile at a specific time. The data packet is first transmitted from the consumer to whichever network node in the grid is connected to the consumer. As payload, the transmitted data packet contains information regarding the amount of energy required, the power profile, the duration and the start of the washing process. Power plant operators are generally given as receivers. The data packet transmitted by the router of the consumer to the network node in the grid is routed at this first network node in such a way that it is made available to all power plant operators connected to the network node. The power plant operators in turn send data packets in the opposite direction which contain the requesting consumer as a receiver and offer said consumer the amount of energy to be supplied under its conditions. The router of the consumer or a controller connected thereto can then select the offer most favourable to the consumer, either automatically or with the manual assistance of a user.

At the agreed time, the energy generator provides the amount of energy requested by the consumer in the form of an energy packet having the ordered power profile. In order to keep the complexity as low as possible, we will consider in this example a low-voltage direct current network, in which the energy generator also actually feeds the amount of energy provided having the ordered power profile and fed into the grid.

Each energy packet fed into the grid is accompanied by a data packet which at least carries information regarding the consumer of the energy packet to which said energy packet is to be provided. For this purpose the power plant has a router which feeds both the energy in the form of packets into the grid and also data packets which accompany the flow of the energy packets through the network. The data packets associated with the respective energy packets are transmitted shortly before the corresponding energy packet is fed in order to allow a transmission of energy without an energy store being necessary at the individual network nodes before the routing to the next element in the network. The data packet arriving at the network node is forwarded on to the relevant consumer based on its consumer addressing. At the same time, the router switches the grid in such a way that the energy packet is also forwarded on to the consumer which is noted in the data packet as the target address.

Insofar as the above-described embodiments can be implemented at least in part, a software-controlled processing device being used, it is clear that a computer program which provides such a software control and a storage medium on which such a computer program is stored are to be considered aspects of the invention.

Further advantages, features and possible applications of the present invention will become clear on the basis of the following description of embodiments and the associated drawings, in which:

FIG. 8 shows a source code for an exemplary signalling via SIP for a power request in a grid according to the invention;

FIG. 16 shows the transition between voltage levels in a grid according to the invention.

Figure 1:
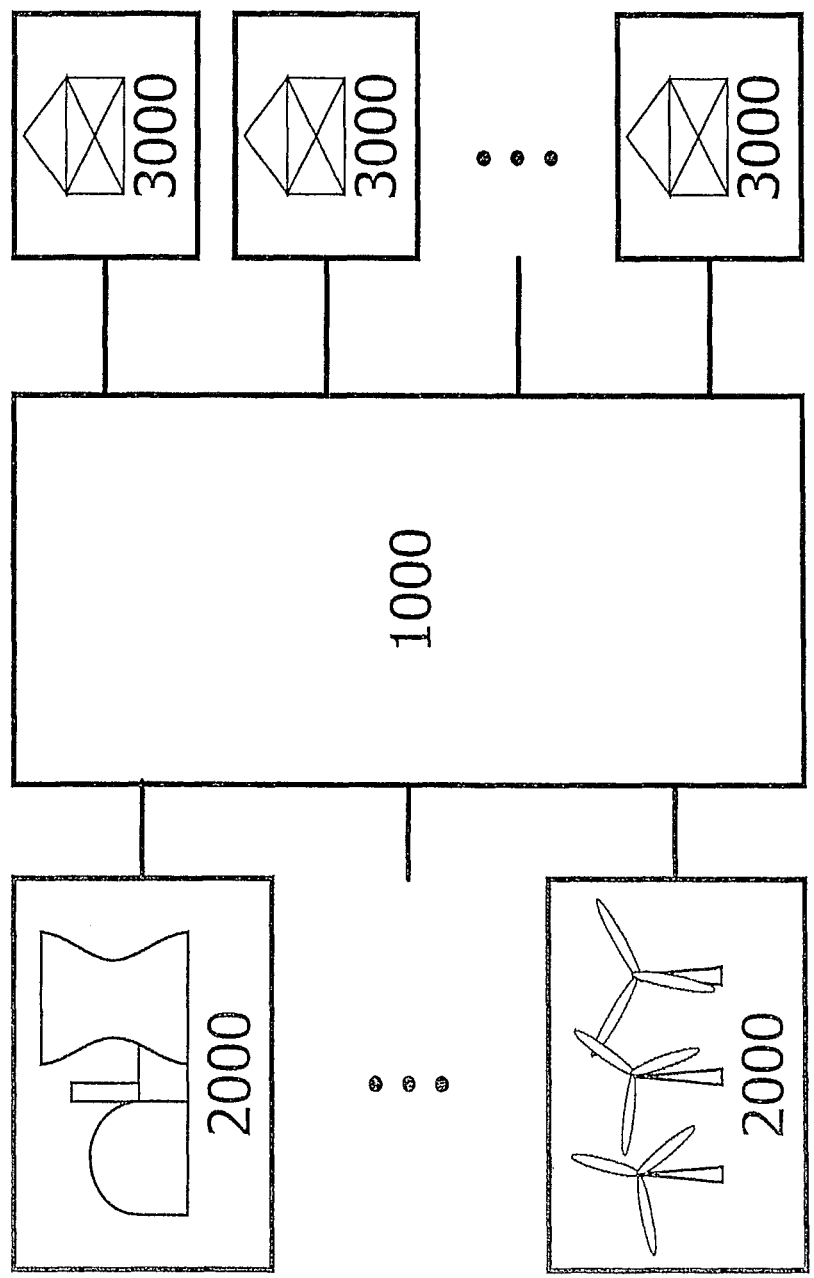
FIG. 1 is a schematic view of a grid according to one embodiment of the present invention.

FIG. 1 shows a schematic view of a first embodiment of an electricity grid 1000, via which all electricity generators 2000 and consumers or users 3000 are interconnected. Such an intelligent network is adapted in particular for grids in which there are integrated renewable energy sources with a large temporal fluctuation of the amount of energy provided. The network 1000 is not statically switched, but instead allows the electric current to be forwarded to the individual network nodes by a routing of energy packets.

Figure 2:
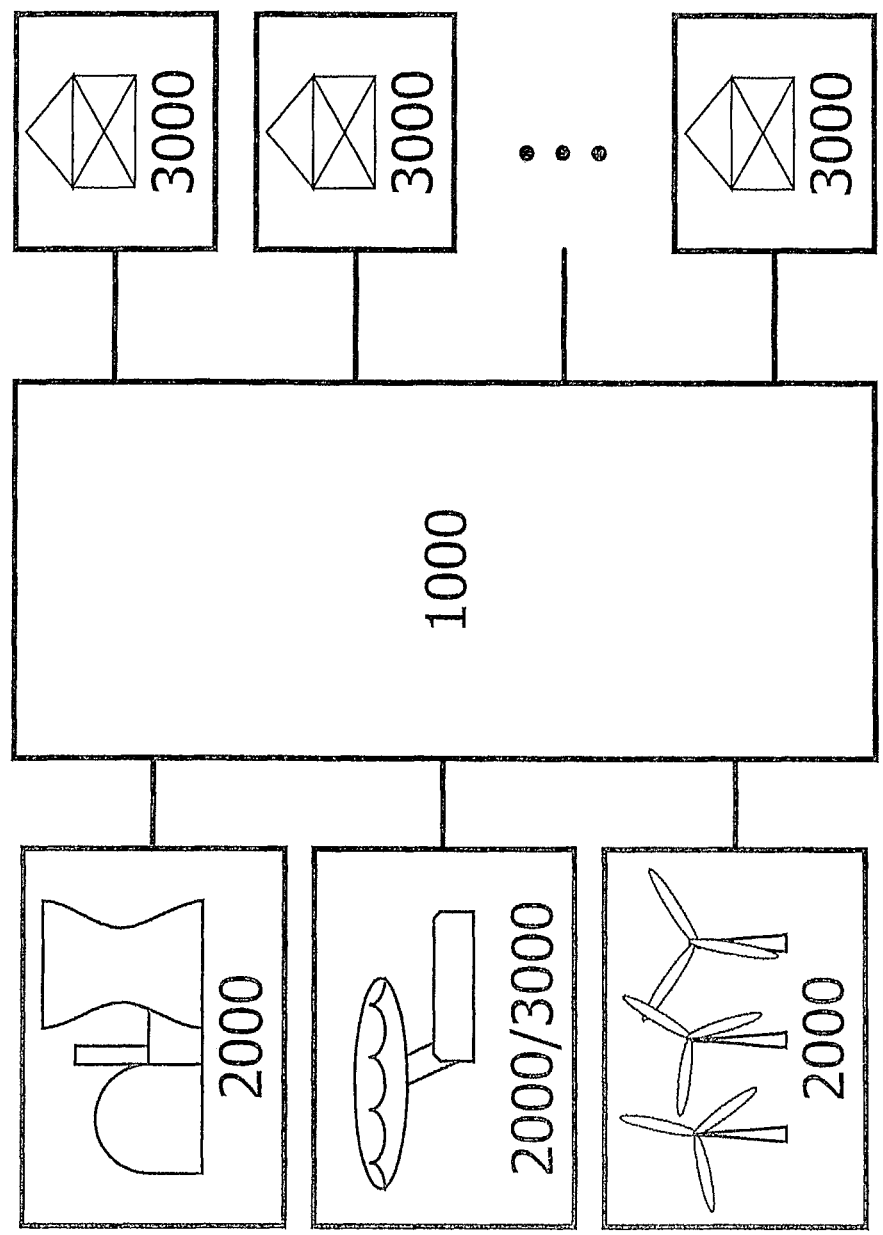
FIG. 2 is a schematic view of a grid according to a further embodiment of the present invention.

For example, at high wind a situation may arise in which the wind turbines connected to the grid produce more power than can momentarily be received by the users 3000. For this purpose the grid illustrated by way of example in FIG. 2 has storage means both on the side of the generator 2000 and on the side of the consumer or user 3000. Such a store may be a water storage power plant or else a battery or an accumulator of an electrically operated motor vehicle. With an overall view of the network, the boundaries between generators 2000 and consumers 3000 thus disappear in part, for example because the water storage power plant and the motor vehicle represent both generators and consumers, i.e. at specific times they are receivers of energy whilst at other times they feed energy into the network 1000.

In order to cope with these high demands placed on a grid, the grid 1000 according to the invention has a routing function which makes it possible to transmit energy packets over individual paths through the grid 1000 from a generator 2000 to a consumer or user 3000.

Figure 3:
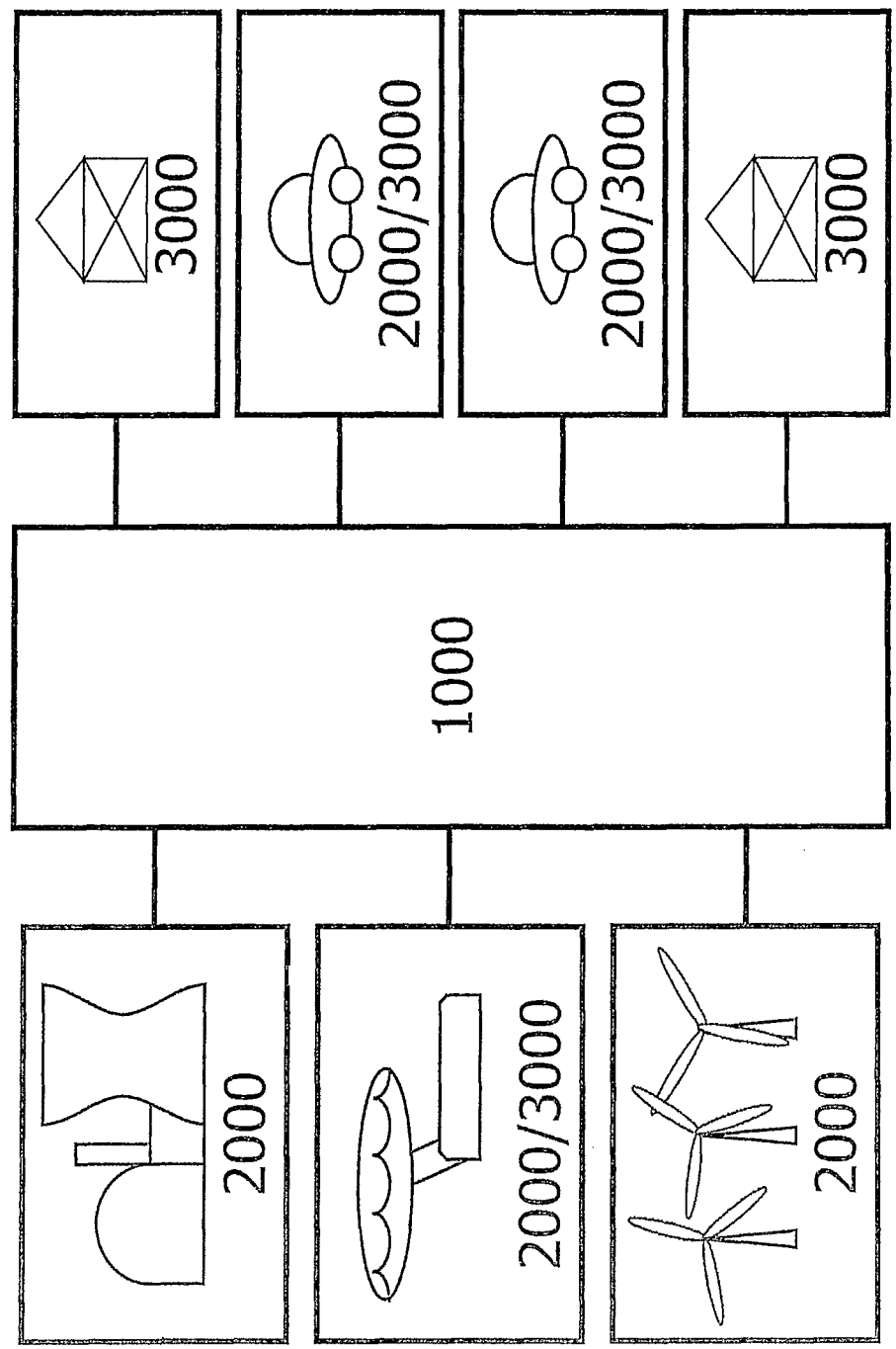
FIG. 3 shows a simplified embodiment of the grid from FIG. 1.

FIG. 3 illustrates an example of a simply structured grid comprising a single central power plant 2000 and four users 3000. This example of the grid according to the invention shows, by way of introduction, how the grid 1000 reacts to a defined demand situation. For this purpose the individual components, in particular of the user 3000 and of the grid 1000, will be described hereinafter in a number of embodiments.

Figure 4:
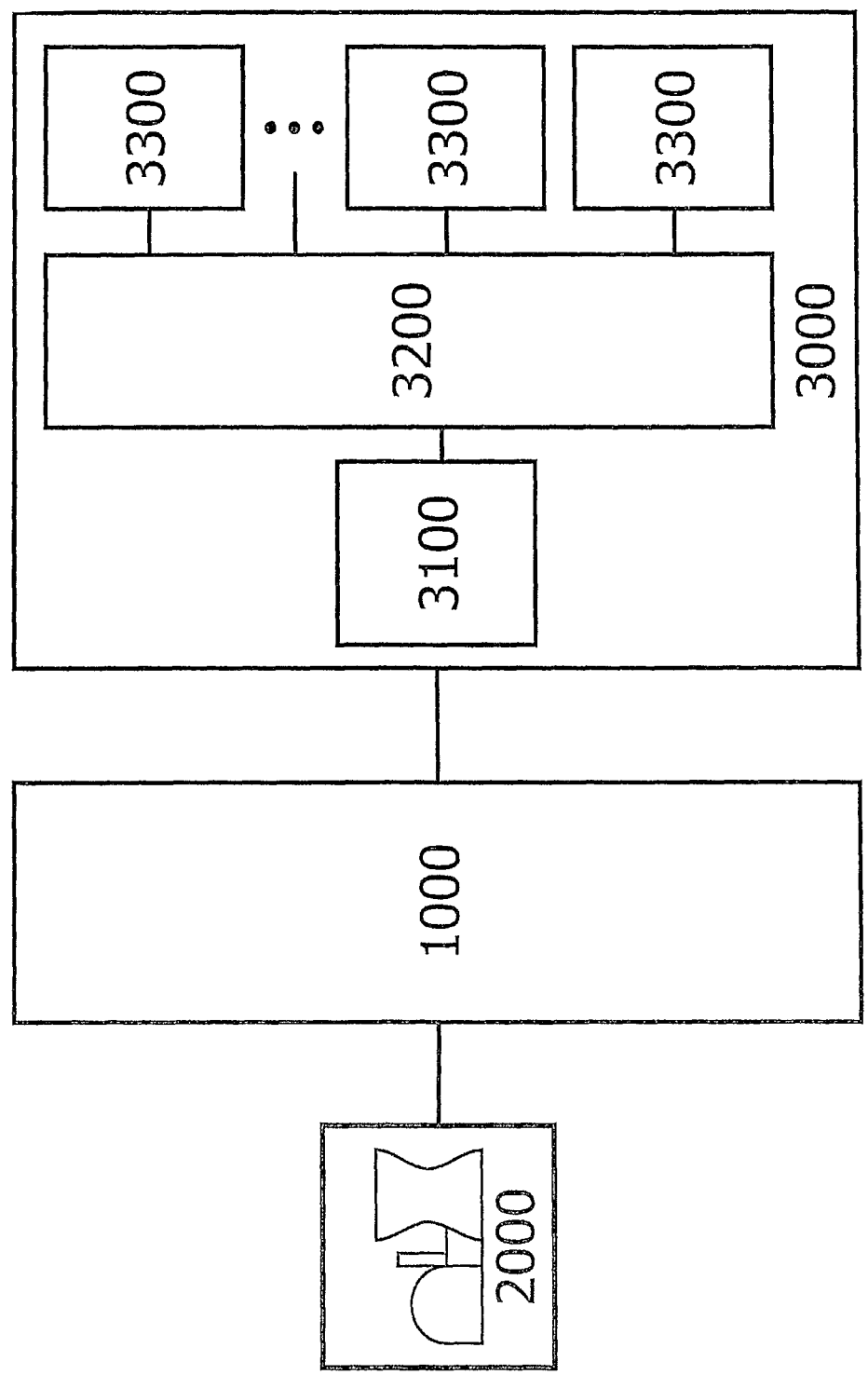
FIG. 4 is a schematic view of an embodiment of a consumer connected to a grid according to the invention.

FIG. 4 is a schematic view of the structure of a user 3000 which is connected to a grid 1000. A service connection 3100 connects the domestic network 3200 to the dynamically routed grid 1000 and, via this, in turn to the power plant 2000. In order to be able to react dynamically to the demand situation of the household 3000, the service connection must first transmit a power request to the grid 1000.

The technical implementation of such a power request and the further transmission of control information in both directions between the user 3000 and the power plant 2000 are referred to as signalling and will be described in greater detail further below. Individual users 3300 are connected to the domestic network 3200, in the present example individual electrically operated domestic appliances such as a washing machine, a refrigerator and domestic lighting.

The service connection 3100 is formed similarly to the router of each network node of the grid 1000. In the simple embodiment illustrated, the service connection 3100 is merely a consumer of electrical energy, i.e. it does not have to have a function for a routing of energy packets to a consumer. However, in alternative embodiments in which the consumer 3000 has an energy store, the contents of the energy store also being made available to other users, the domestic connection 3100 is also able to feed energy into the grid 1000 and thus has the same bidirectional function as the individual routers of the network nodes of the network 1000.

Figure 5:
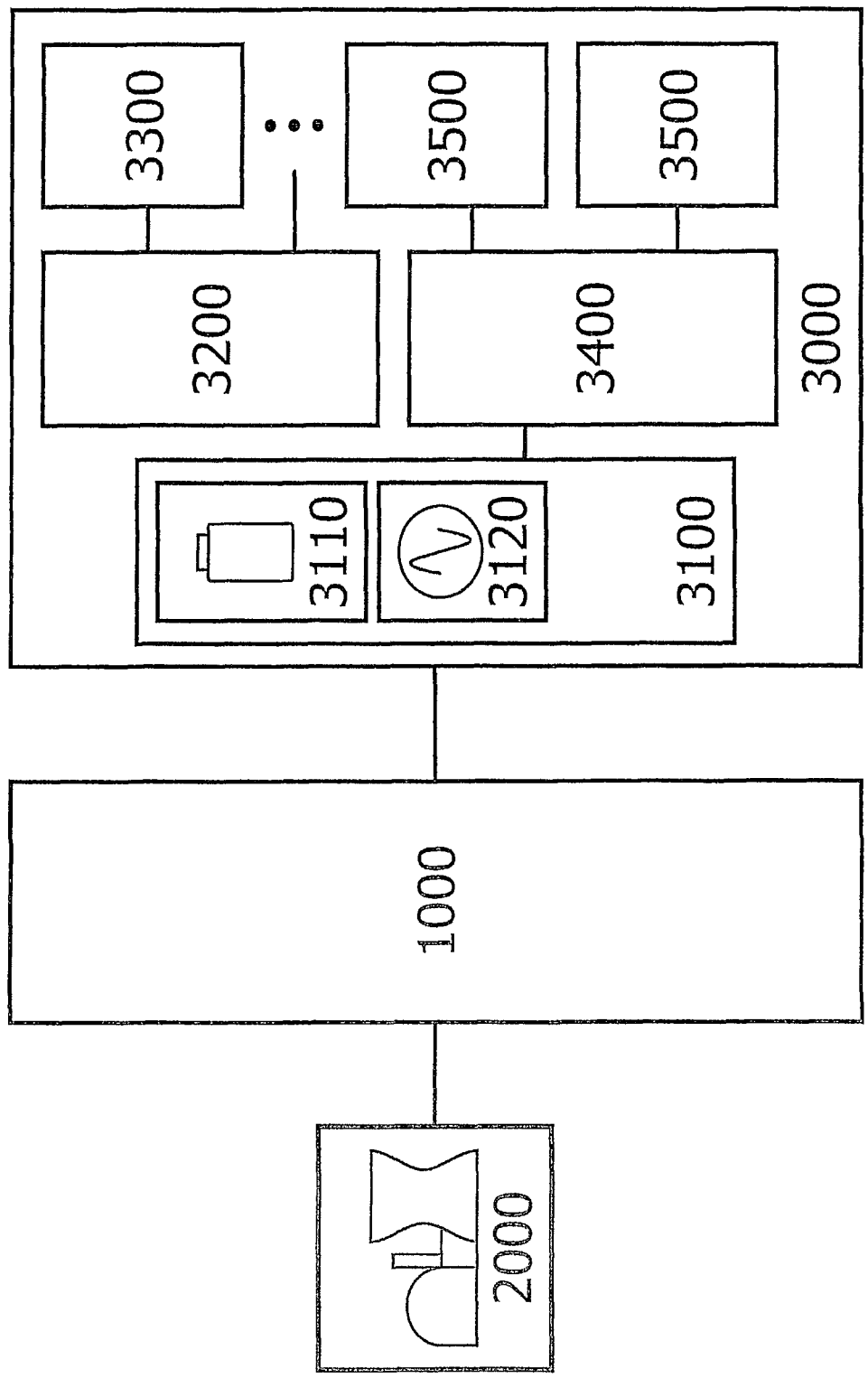
FIG. 5 is a schematic representation of an alternative embodiment of a consumer connected to a grid according to the invention.

FIG. 5 shows an alternative embodiment of the consumer 3000. The service connection 3100 has an energy store, in the embodiment illustrated an accumulator or a battery 3110. This serves as a buffer for storing energy which was supplied beyond the specific demand of the user 3000.

On the one hand, a conventional domestic network 3200 which, as described before, supplies conventional domestic appliances 3300 with common alternating current at 220 volts and 50 hertz, is connected to the battery 3110 or the domestic connection 3100. For the supply of the conventional domestic network 3200 the service connection 3100 has a converter 3120 which converts the direct voltage provided by the battery 3110 into an alternating voltage and transforms this to the corresponding voltage level. Beyond the conventional alternating voltage domestic network 3200, the service connection 3100 also supplies a 'smart grid' domestic network 3400 comprising corresponding domestic appliances 3500. Similarly to the grid 1000, the smart grid domestic network 3400 itself also has the option of signalling and thus of intelligent distribution of the electrical energy within the household. This smart grid domestic network 3400 makes it possible for example to use intelligently the energy provided by the battery 3110, for example by operating a washing machine at night when the other energy users in the household are idle.

In the embodiment illustrated in FIG. 5 the battery 3100 comprises a store management which allows the operator, in this case the person living in the house, to define specific level marks of the battery 3110. Once these level marks have been reached, the domestic connection automatically, performs actions. If a minimum level of the store 3110 is reached, a request can thus be placed for the purchase of a specific amount of energy having an appropriate power profile, wherein this energy is purchased to cover the basic demand of the household, irrespectively of the price offered for the energy. The power profile P(t) associated with the energy packet is automatically determined by the store management with the aid of predeterminable rules.

Figure 6:
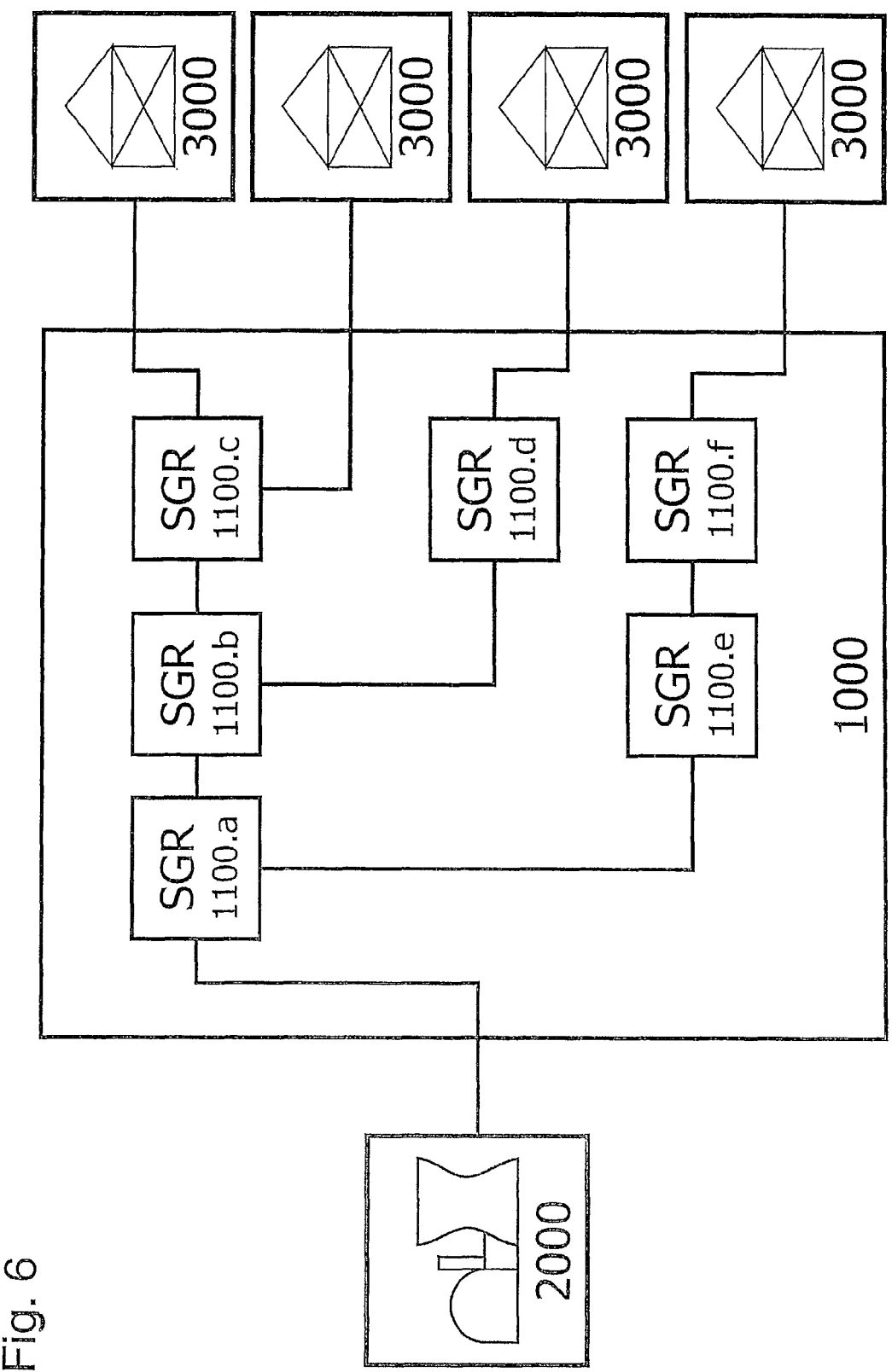
FIG. 6 shows the grid from FIG. 3 with a plurality of network nodes.

FIG. 6 shows the grid 1000 with a total of six network nodes 1100.a to 1100.f, of which the function is basically provided by individual smart grid routers (SGR). The topology of the network 1000 shown is merely an example, wherein the function of the network 1000 does not depend on the specific topology formed of network nodes 1100 and lines.

The transmission of power from a power plant 2000 to a single consumer 3000, in the image of FIG. 6 the upper consumer, will now be considered. For signalling, the domestic connection 3100 of the consumer 3000, for example when the minimum level of the energy store 3110 is reached, transmits a power request to the network node 1100.c via which it is connected to the grid 1000. The network nodes 1100.a, 1100.b and 1100.c or the SGRs thereof route this request to the power plant 2000 connected to the network 1000.

Figure 7:
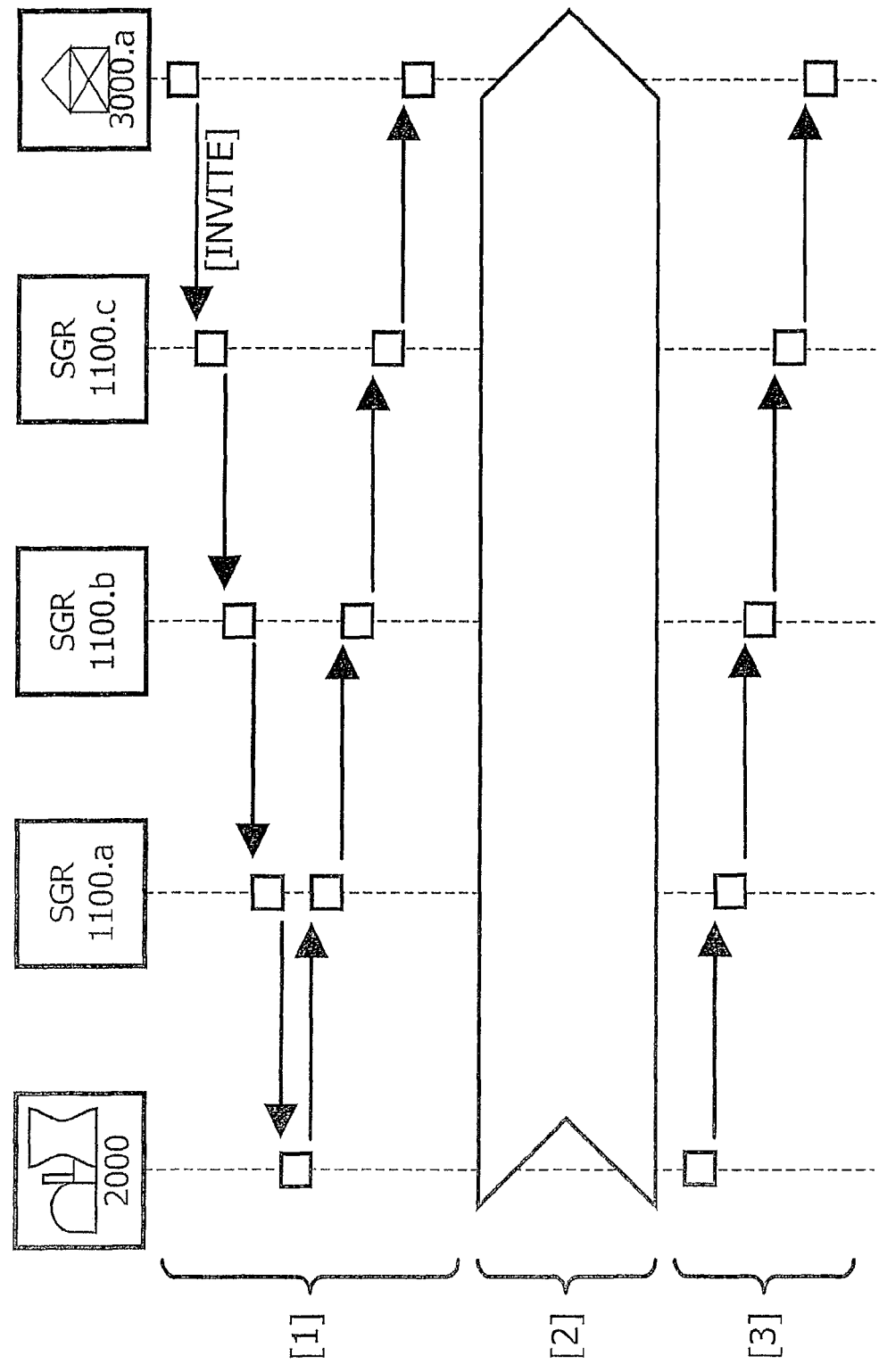
FIG. 7 shows a diagram of the sequence of signalling and energy transport in a grid according to FIG. 6.
Figure 9:
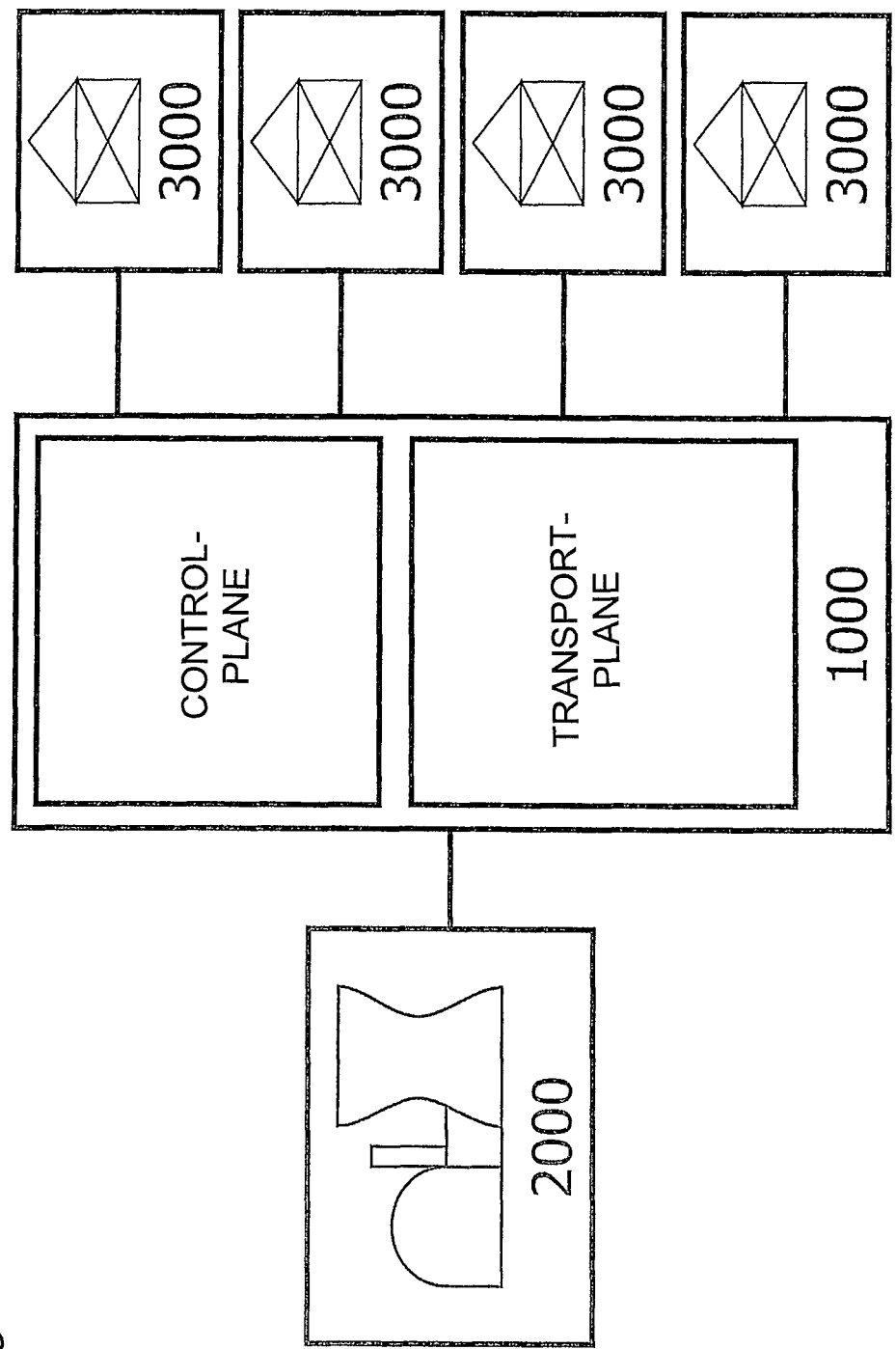
FIG. 9 is a schematic view of the division of the grid according to the invention into a control plane and a transport plane.

This signalling process is shown in the sequence diagram of FIG. 7 as a process [1]. In the embodiment illustrated the SGR of each network node 1100 is addressed via IP (Internet protocol) addresses in accordance with IPv4 or IPv6 and DNS (domain name service) host names, and the signalling information is exchanged in accordance with SIP (session initiation protocol).

FIG. 8 shows an example of a signalling of a power request for 4 kWh from renewable energy sources at a maximum of 18 cents per kWh. The signalling takes place via SIP by means of an INVITE message in XML format.

If the power plant 2000 can supply the requested power, it signals this to the household via the network 1000. This return path of the signalling is likewise denoted in FIG. 7 by [1].

Thereupon, a path from the power plant 2000, via the individual participating SGRs to the service connection 3100 is defined dynamically in the network 1000 formed of network nodes 1100.a to 1100.c comprising SGRs via a routing method, which path supplies the power of 1 kW for four hours by routing the corresponding energy packets from the power plant 2000 to the consumer 3000.a. This energy supply is denoted in FIG. 7 by phase [2].

In the embodiment illustrated in FIG. 7 the power plant 2000 further signals the termination of the supply in the phase The function of the SGRs in the network nodes 1100 can be better understood if the structure of the network 1000 is first studied in greater detail. In order to support both a transmission of energy, that is to say the transmission of energy packets, and a signalling, that is to say the transmission of data packets, and a corresponding routing of the packets, the network 1000 comprises a transport plane and a control plane.

In the embodiments illustrated in FIGS. 1 to 8 the transport plane comprises two channels: a first for transmission of the data associated with the management and control of the network, and a second for transmission of electrical energy in the form of energy packets for powering the consumer 3000. The two channels of the transport layer are designed as separate lines which are designed as tie lines between the network nodes 1100 as well as between the network nodes and the power plants 2000 and consumers 3000. In order to control and switch these two channels, each SGR of a network node 1100 has power electronics, in addition to the necessary data network elements such as routers and switches, for transmitting the energy packets. If, hereinafter, reference is made to power valves, this is to be understood to mean controllable switches which make it possible to control the energy flow from a network node.

In the embodiments illustrated in FIGS. 1 to 9, each network node 1100 or SGR supports two IPv6 addresses. One address is for IP communication and one is for identifying the SGR in the network 1000. However, both addresses may also be identical.

Figure 10:
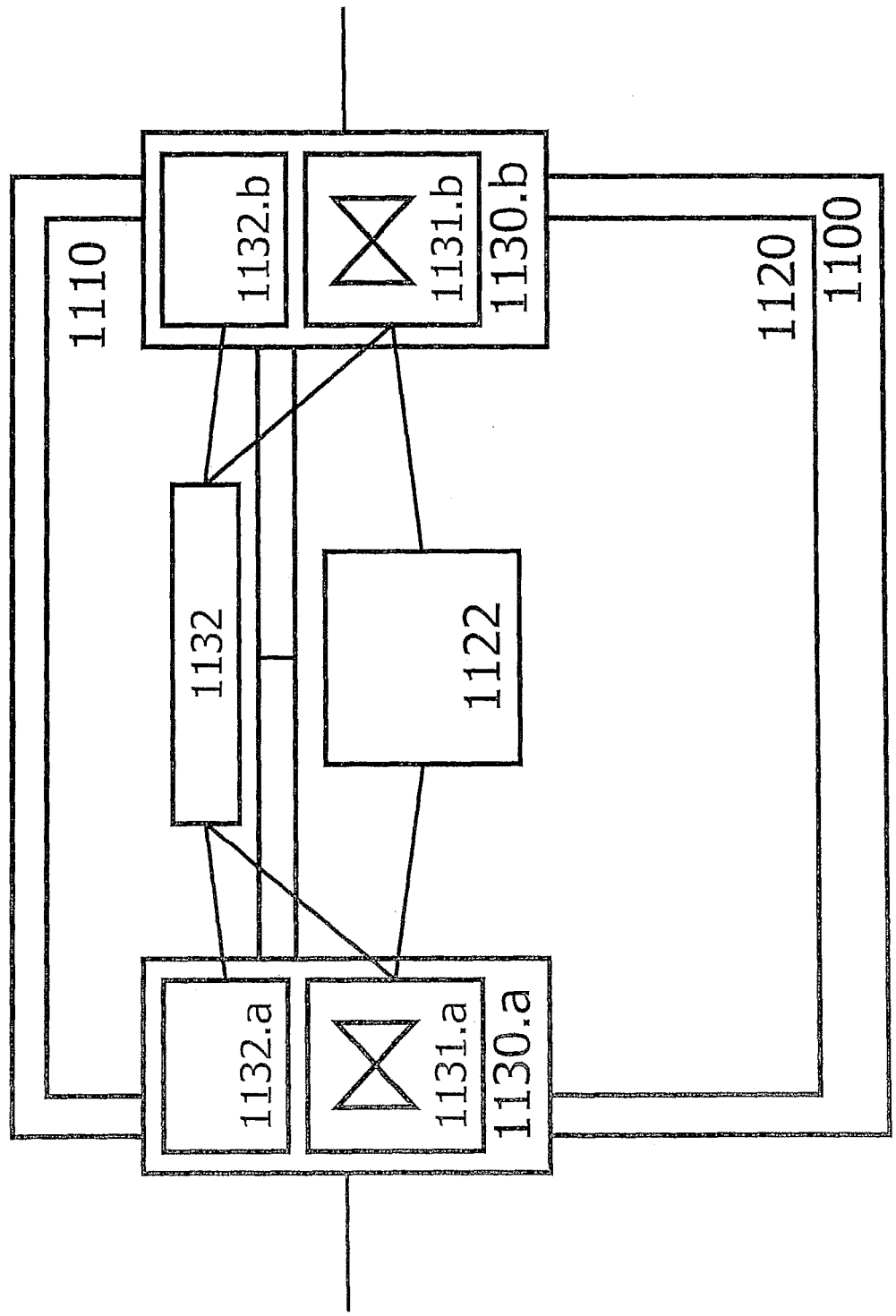
FIG. 10 is a schematic view of the arrangement of an embodiment of a network node according to the invention.

FIG. 10 shows a schematic view of the arrangement of an SGR in a network node 1100. The router of the node 1100 also consists of a control plane 1110 and of a transport plane 1120. The control plane 1110 takes over all management, regulation, control and communication functions. This includes the communication between the routers, therefore in particular also the communication between the grid 1000 as a whole and the connected generators 2000 and consumers 3000.

The interfaces 1130a, 1130b also divide into a control plane and a transport plane. An interface for data communication 1132 is also arranged on the control plane in the interface 1130. This is connected to the control logic 1132 on the control plane and to the IP communication network. On the transport plane the interface 1131 is connected to the energy packet transport network. The transport line connected to the interface is connected to a power valve 1131 which controls the current flow. The control electronics (see FIG. 12) of the power valve 1131 are connected to the control logic 1132 on the control plane. Furthermore, the power valve 1131a is connected to the power valve 1131b of the interface 1130b via a conductor rail 1122. If there are a plurality of interfaces, the associated power valves are connected via a conductor rail 1122. The control electronics of all valves are connected to the control logic 1132, via which they are then controlled. The control logic 1132 has an IP routing function as well as all functions necessary for data communication. Above all, the control logic processes the incoming data packets, has a routing method for determining the route or path of the data packets and energy packets, determines the participating interfaces for the transport of the energy packets and controls the transport of the energy packets via the control of the corresponding power valves. Furthermore, the control logic 1132 comprises a device for combining energy packets to form transport packets, which have to be transported over the same lines, as well as for establishing and transmitting the transport information, that is to say the power profiles and target addresses of the energy packets combined in the transport packets. The control logic 1132 also has a device for breaking down the transport packets with the aid of the transport information transmitted in parallel (the 'transport request') into the energy packets originally contained in the transport packet and for further routing of the original energy packets to the respective target addresses thereof. The control logic 1132 also has a device for sequentially processing incoming and outgoing data and energy packets as well as for fault and monitoring management.

In the embodiment illustrated the control plane 1110 of the network 1000 is structured on IP technology from the prior art. The control plane 1110 of the router forms the IP stack in accordance with the IPv4 or IPv6 addressing model and also an IP address management, the SIP stack with associated control logic, a DNS client, safety functions and a flow control for control of the interfaces 1130.a, 1130.b and distributors in the transport plane.

The routing methods known for packet-switched networks are used to provide a path from a generator 2000 to a consumer or user 3000. In the simplest embodiment shown in this instance, routing tables are used for the routing method. "Smart grid" (SG) addresses are used to identify the network nodes 1100. These SG addresses are structured similarly to the rules for Internet addresses. In order to make available a sufficient number of addresses, the IPv6 addressing model is also used for the SG addresses. The routing methods known from IP technology can be enhanced by cost functions, which take into account the costs of transmission and loss when establishing supplier paths through the network 1000. For example, local energy suppliers may be preferred as a result.

For example, if the node which is connected to the energy supplier or power plant 2000 (also referred to hereinafter as the supply node) has identified the path through the network 1000 by means of the routing method, in other words determined the sequence of the participating network nodes 1100 or SGRs, it creates a list of the participating SG addresses. This path list is then transmitted to the participating SGRs by means of signalling, in this case on the basis of the SIP protocol, as part of the transport request.

The transport plane 1120 of the network node guides the current, i.e. the energy packets to be transmitted, under well-defined rules with well-defined properties logically parallel to the data packets of the signalling through the network 1000 from interconnected SGRs. Central functional groups are in particular the interfaces 1130 to the next connected SGRs.

In the embodiment illustrated the communication interfaces 1132.a and 1132.b are designed as an Ethernet interface, as is the case in the prior art where an IP communication is used in the physical and data-link layer in accordance with the OSI layer model.

In the example illustrated the smart grid or network 1000 is a direct voltage network. For the functioning of the packet-based energy transmission it will be assumed hereinafter that the provided and transmitted energy packets are received completely by the respective receivers. Hereinafter a situation will be considered in which the network node 1100.$a$ is to transmit an energy packet intended for the node 1100.$c$ to a node 1100.$b$. Each of the participating nodes 1100.$a$, 1100.$b$ and 1100.$c$ comprises an SGR, which enables a routing both of the data packets in the IP network and of the energy packets in the grid.

The transmission of the data and energy packets requires an absolute time over the entire network. For this purpose all participating elements of the network 1000 are synchronised in terms of time using the method of synchronous Ethernet. Alternatively, synchronisation could also be achieved by an additional signalling of the time, which communicates the start and end of events in the signal chain.

The operation of the provision of energy packets at the output of a network node will be described hereinafter. Each energy packet is defined by its power profile. The power profile is in turn defined by the sequence of individual energy frames F(i) such that the following conditions apply:
1. for the delivery time T, T=end time−start time;
2. the delivery time T is divided into time intervals dt(i) so that T=the sum of (dt(i));
3. t(i) is the absolute start time of the time interval dt(i);
4. through the index i an absolute ordering relation is produced synchronously with the absolute time. The start time of the frame F(i) is thus always uniquely linked to i;
5. a power P(i) is associated with each time interval so that, for the energy of the packet, E=the sum of (P(i)×dt(i)). The interval dt(i) with power P(i) is referred to as an energy frame or basic energy packet F(i).

Figure 11:
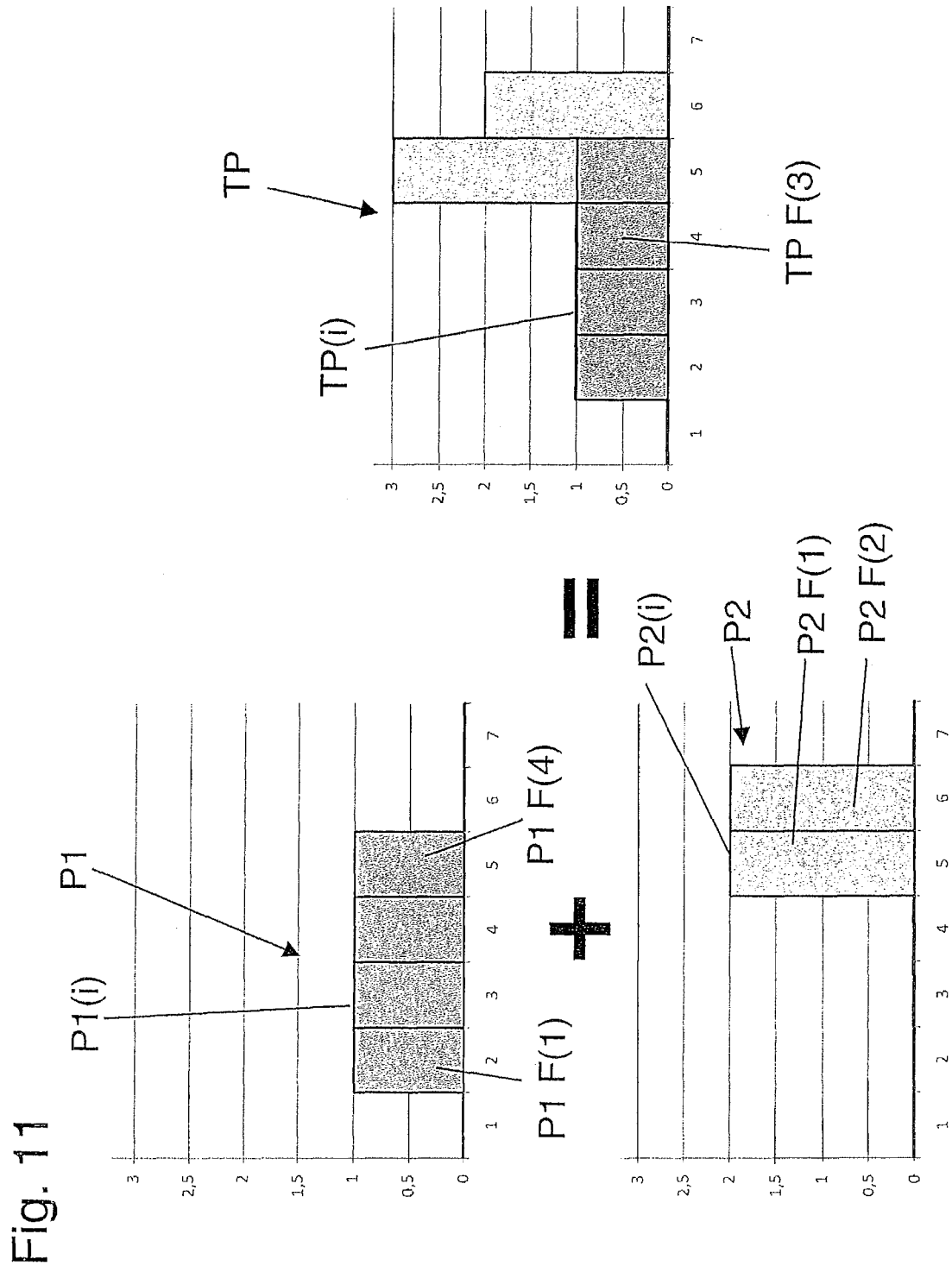
FIG. 11 is a schematic view of the course over time of the energy packets according to the invention.

An energy packet is illustrated in the left upper portion of FIG. 11 as a packet P1 having a corresponding power profile P1($i$). The packet P1 is to be transmitted from the node 1100.$a$ to the node 1100.$b$, in other words the energy packet P1 has to be transmitted via a line between the nodes 1100.$a$ and 1100.$b$, in particular between the output interface of the node 1100.$a$ and the input interface of the node 1100.$b$. If, during the same time period, a second packet P2 having a second power profile P2($i$) (illustrated in the left lower portion of FIG. 11) is to be transmitted via the same line from the node 1100.$a$ to the node 1100.$b$, a transport packet TP (on the right in FIG. 11) having the combined transport power profile TP(i) has to be transmitted via the line. For a transmission of power between two interfaces, the transport power profile TP(i)s is defined by the sum of the power profiles available for transport, in the specific example P1($i$), P2($i$).

Owing to the corresponding transport requests, transmitted by the signalling, which are initiated by the supply nodes, that is to say the nodes connected to the generators, the control plane of the SGR receives the packets available for transport as well as the target addresses and the node addresses participating in the transport process. In order to process these transport requests, the control plane has a queuing system. The control plane of the SGR can determine the subsequent router or network node to which it is to transmit the packet, either from the list of nodes participating in the transport process (such a list is contained in the transport request) or by means of an implemented routing algorithm. The control plane of the SGR has the interfaces with the connected SGRs listed in a table. With the aid of this list the control plane allocates the corresponding interfaces to the packets to be transmitted. The corresponding transport profiles are then established for each interface. The corresponding transport profile is adapted again with each input of a new transport request for an energy packet.

The packet P1 consists of four energy frames P1 F(1) to P1 F(4). By contrast, the packet P2 consists merely of two energy frames P2 F(1) and P2 F(2) of equal length, but with different content.

A moment in time t(i) at which the packet transmission is in the frame TP F(i) will now be considered. The supply of the frame TP F(i+1) is now queued as next. The moment in time t+dt belongs to the point i=1 as a starting point for the frame TP F(i+1).

The control plane of the SGR delivers, via a corresponding interface, the subsequent value TP(i+1) at the moment in time t for the supply of the frame TP F(i+1) to the power control of the transport plane.

The transport plane has all interfaces to the connected lines, both for data and energy transmission. Each interface has a power valve and an interface to the control plane. Via this interface to the control plane, the power valves receive the power variables and/or power profiles TP(i) for the transport of the corresponding energy frames.

In the embodiment illustrated energy packets are transmitted to all interfaces in a fixed cycle, that is to say energy packets are transmitted from the respective interfaces at fixed moments in time.

The power valve consists of power electronics (PE), a control for the power electronics and a power measurement on the output side on the outgoing line to the next node as well as an interface to the control plane.

The controller receives from the control plane the power variable TP(j), that is to say the maximum power to be transmitted, for the next frame F(j). The controller of the power electronics thus receives for the moment in time t(j) the control variable TP(j) as a setpoint value. From the moment in time t=>t(j), the controller of the power electronics ensures that the actual value $TP_{actual}$(t+dt) is less than or equal to the setpoint value TP(j). This applies up to the moment in time t=t(j+1), after which the new controlled variable TP(j+1) applies. Alternatively, the actual value may also be less than the setpoint value. For each frame available for delivery at the next cycle step, the control plane transmits the setpoint value to the controller of the power electronics. In this way the output power is adjusted to the line connected to the corresponding interface.

With a constant power variable TP(i) and uniform load, the power valve is always open and there are no switching or control processes. The power valve thus acts as a switch which opens and closes the line.

Figure 12:
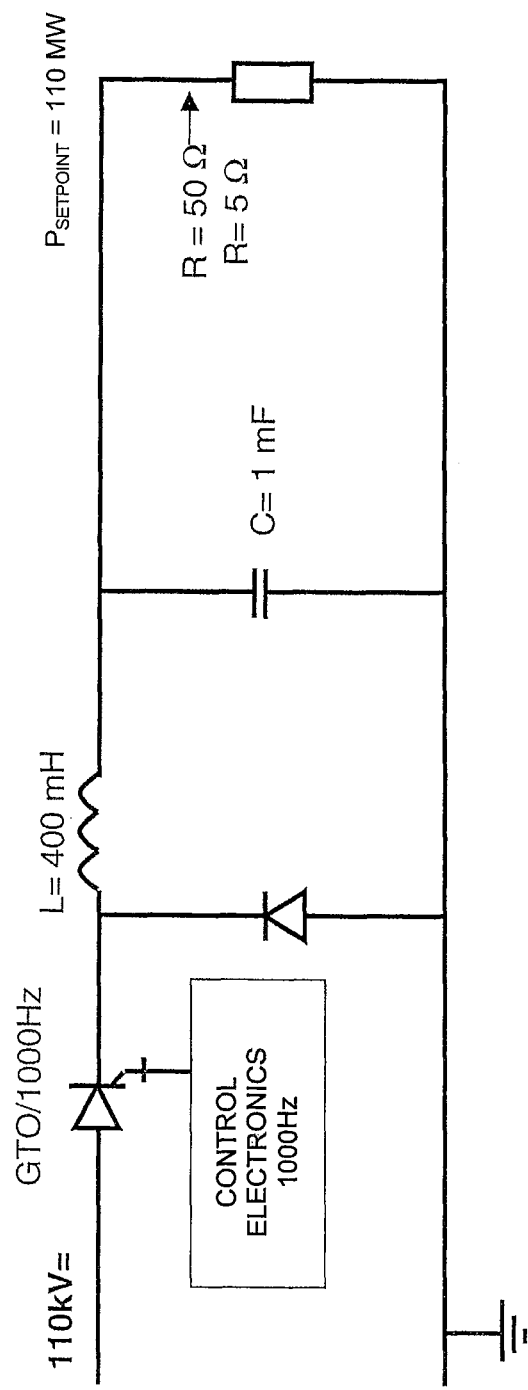
FIG. 12 shows the arrangement of a power valve for a router according to the invention.

The power valves 1131.$a$ and 1131.$b$ from FIG. 10 are each basically formed from a GTO thyristor so as to allow precise switching of the output of the interfaces 1130.$a$ and 1130.$b$. A circuit diagram of the power electronics or the power valve is illustrated in FIG. 12. In addition to the GTO thyristor, the power electronics comprises a low-pass filter formed of a capacitor C and a coil L in order to dampen the transient phenomenon when the GTO thyristor is connected and to smooth the control processes. The resistance R illustrated on the right-hand side of the circuit in FIG. 12 symbolises the load applied to the interface.

In accordance with this general description of the operation of the SGR and in particular of the power valve in the transport plane, a realistic example for implementing a power limit in a network according to the invention will now be considered. Such a power limit prevents a consumer, at a specific moment in time, from drawing more power from the network than it requested or ordered.

Figure 13:
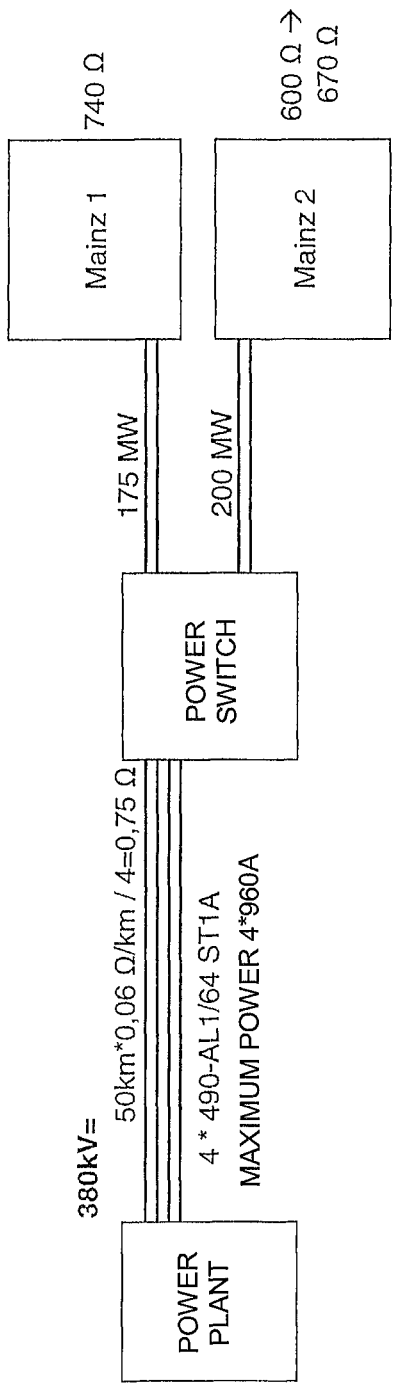
FIG. 13 shows a block diagram of a power control according to the invention comprising two consumers.

A node A, in this case a power plant, supplies a node B, in this case a power switch, with a packet of constant power. The node B in turn supplies a node C (Mainz 1) with a packet having a constant power profile of 175 MW and a node D (Mainz 2) with a packet having a constant profile of 200 MW. FIG. 13 shows the sketched network in a schematic illustration with a 380 kV line from the power plant to the power switch and with the provision of the corresponding powers at the parts of town Mainz 1 and Mainz 2.

Figure 14:
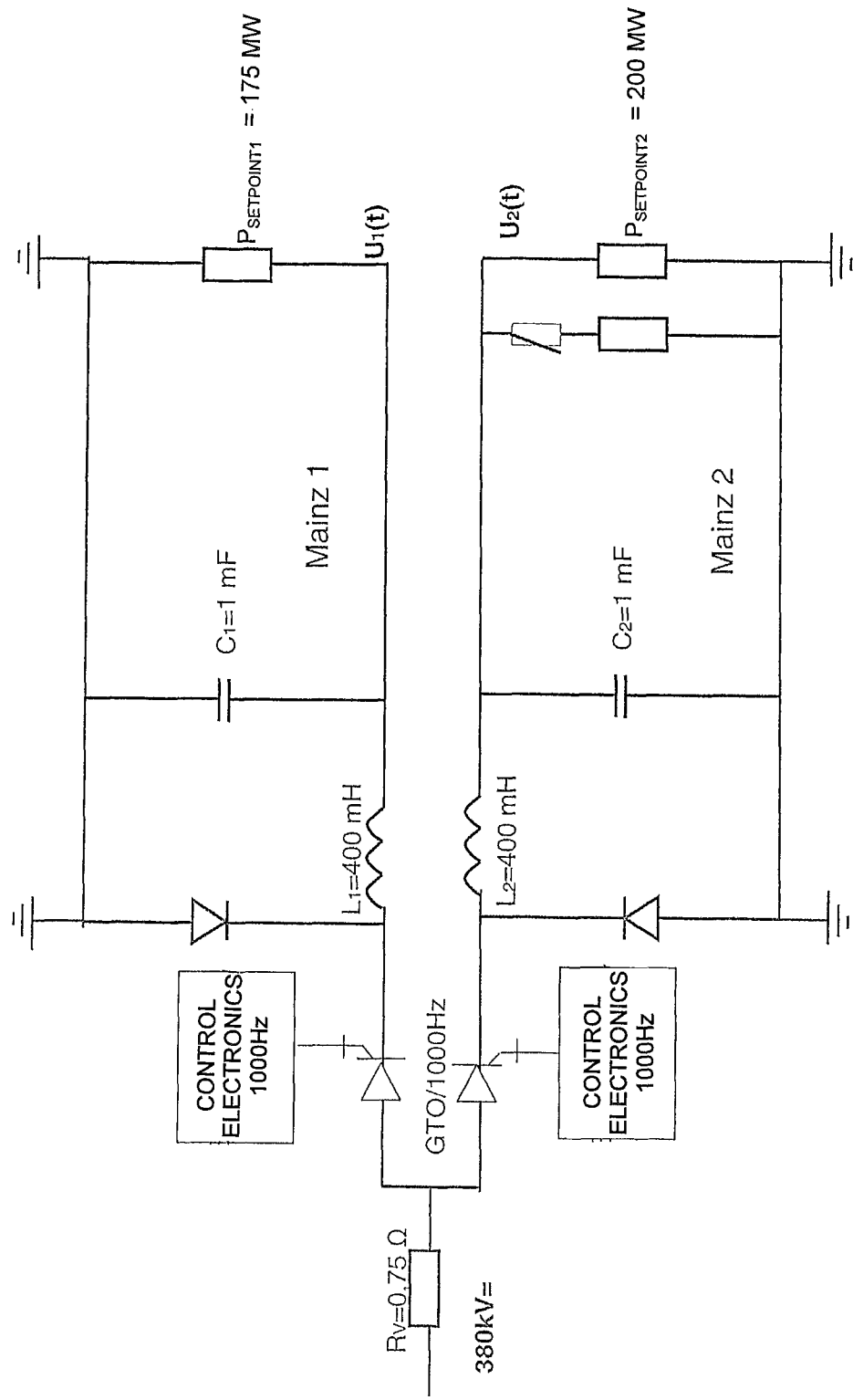
FIG. 14 shows the arrangement of a branching-off of current with two power valves in a router according to the invention.

The power electronics of the node B is illustrated in FIG. 14, wherein the power electronics shown comprises two GTO thyristors or two power valves in order to enable a routing, that is to say a distribution of power, of the energy packet incoming at the node B to the packets which are provided to the nodes C and D, that is to say to the parts of town Mainz 1 and Mainz 2. A switch is provided in the second (lower) branch Mainz 2 and makes it possible to connect an additional load.

Figure 15A:
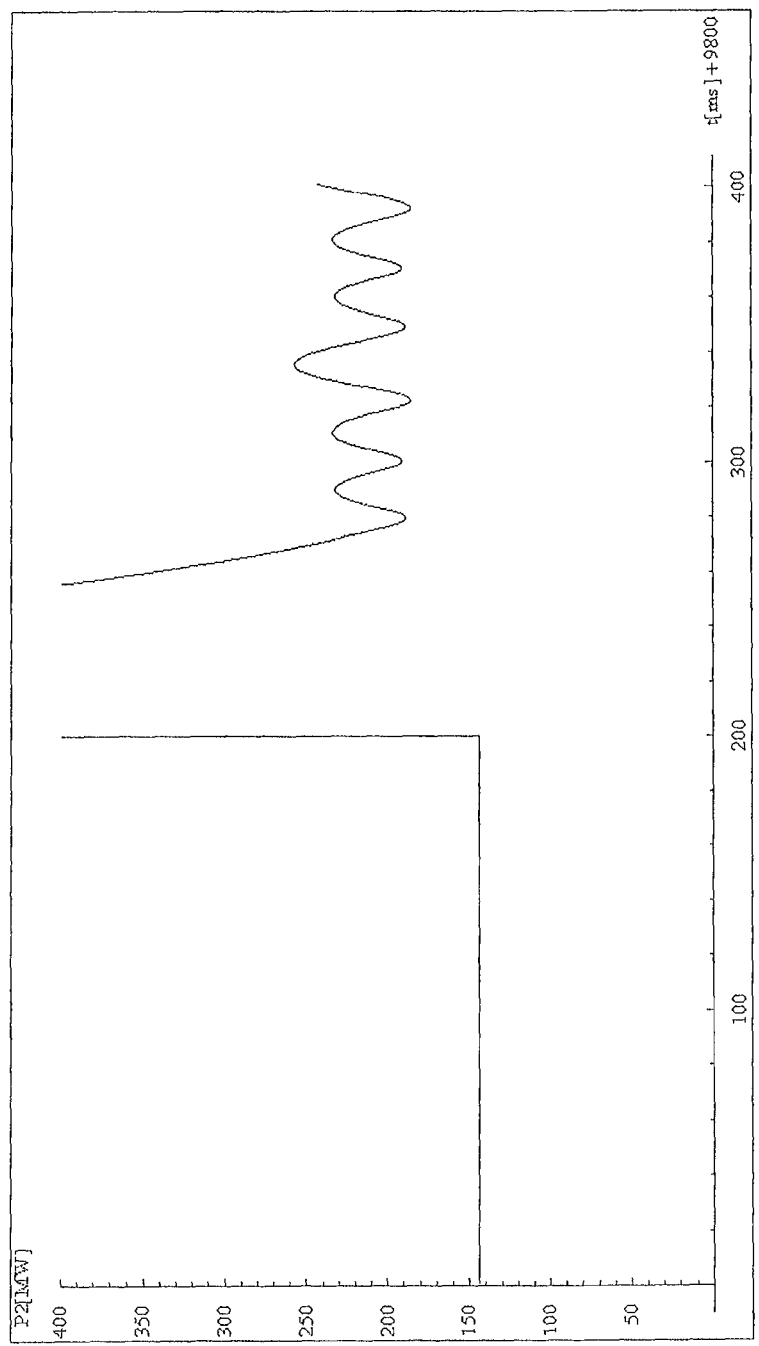
FIG. 15a shows the result of a simulation of operation of the circuit from FIG. 14 with a change of load for the power in branch 2.
Figure 15B:
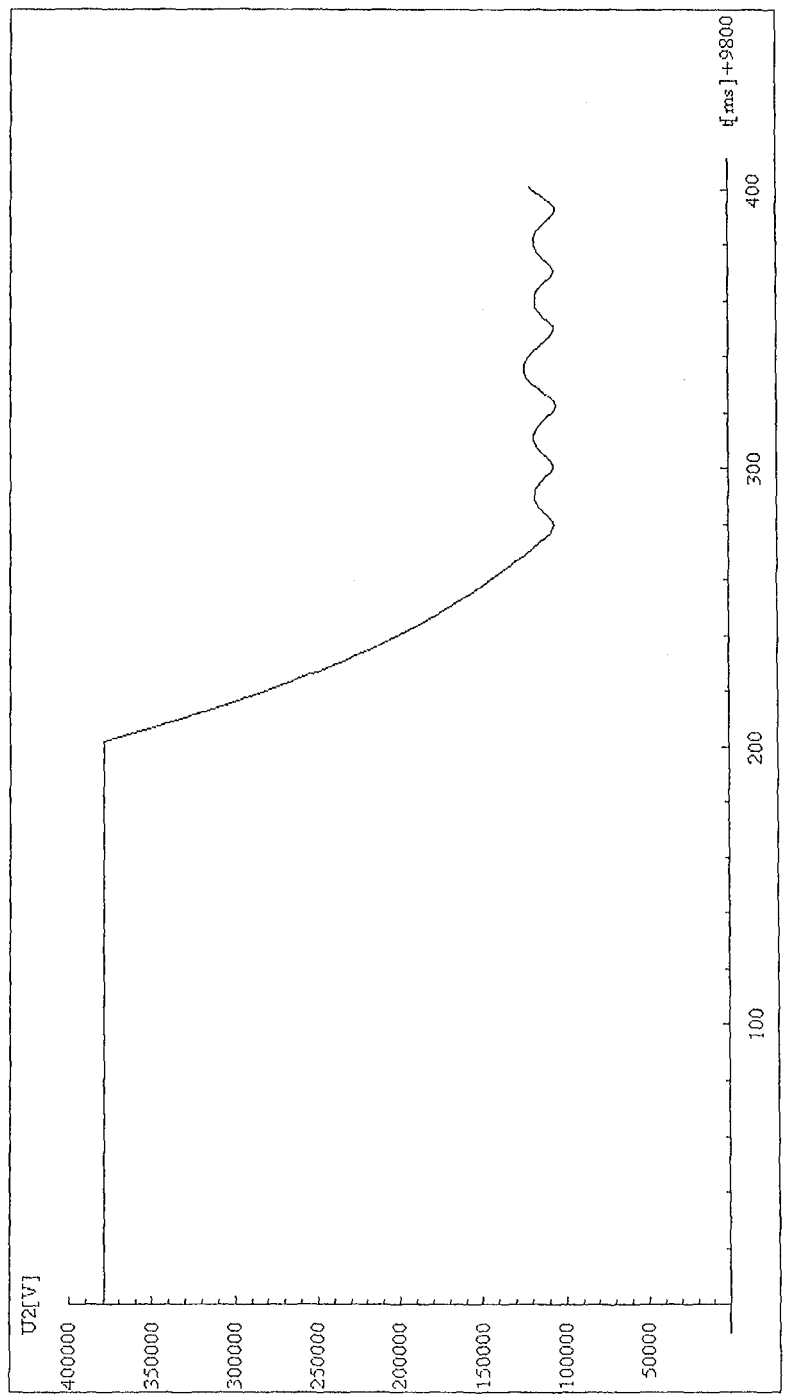
FIG. 15b shows the result of a simulation of operation of the circuit from FIG. 14 with a change of load for the mean voltage in branch 2.
Figure 15C:
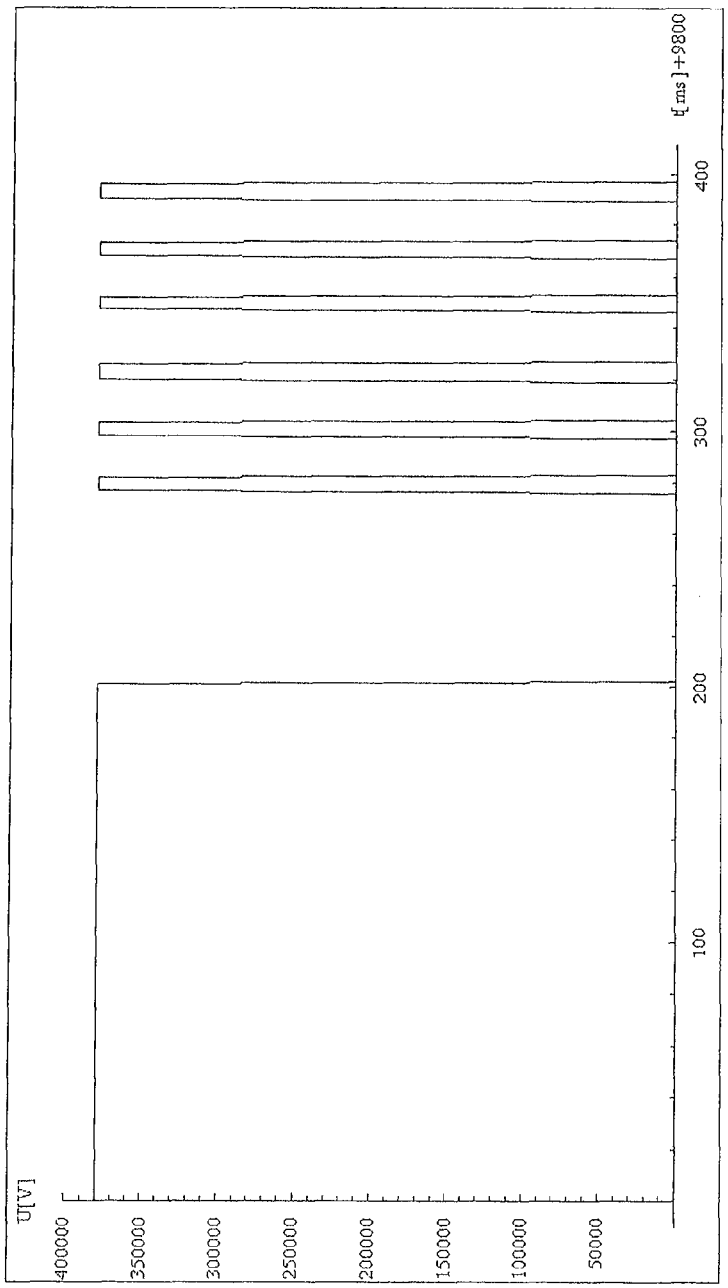
FIG. 15c shows the result of a simulation of operation of the circuit from FIG. 14 with a change of load for the course over time of the modulated voltage in branch 2.

FIGS. 15*a* to 15*c* show the results of a digital simulation for a change in load, in which in the branch Mainz 2 where t=200 ms a load having a power consumption of 2.3 GW is connected, wherein the control of the circuit from FIG. 14 provides a power limit. Whilst FIG. 15*a* shows the behaviour of the power when the load is connected in the branch Mainz 2, FIG. 15*b* illustrates the behaviour of the voltage at the capacitor C2 when the load is connected, and FIG. 15*c* shows the modulation of the voltage at the power valve of the branch Mainz 2, which leads to the effective voltage from FIG. 15*b*.

The GTO of the branch Mainz 2 is initially permanently opened since less power is drawn than requested. When the additional load at t=200 ms is connected, the setpoint power of 200 MW is exceeded and the control electronics close the GTO in the branch Mainz 2 in order to limit the power which can be drawn from the network to the setpoint power. Thereupon, the voltage illustrated in FIG. 15*b* decreases at the capacitor C2, as does the power which can be drawn illustrated in FIG. 15*a*, which levels off approximately at the setpoint power of 200 MW. As can be seen from FIG. 15C, the control in the illustrated embodiment functions with a constant pulse-width of the voltage pulse and modulates the frequency thereof so as to achieve the mean voltage necessary for the limitation of the power which can be drawn.

For example, the current grid in Germany implements four voltage levels, typically a maximum voltage at 220 kV or 380 kV, high voltage at 110 kV, medium voltage from 1 kV to 50 kV or 60 kV and low voltage at 230 V or 400 V. In one embodiment the routed network 1000 may also implement such a division into voltage planes. The voltage levels existing in Germany merely serve as an example, and all other divisions into voltage levels can also be mapped onto the smart grid according to invention.

The upper image from FIG. 16 shows an example of the implementation of a direct voltage network having 4 voltage levels. The power plant 2000 is a conventional power plant for generating alternating voltage. However, this one has a rectifier so as to feed a direct voltage into the grid. Either the direct voltage provided can be used directly on the side of the consumer or household 3000, or a conventional domestic alternating voltage is generated on the house side with the aid of a converter. Since the meshing of the network typically also increases with the transition from a higher to a lower voltage level, the power entering a voltage level typically has to be distributed to a plurality of connected networks by the use of step-down converters, as shown in the lower image of FIG. 16.

For the purpose of original disclosure, it is noted that all features as revealed to a person skilled in the art from the present description, drawings and claims, even if only described specifically in conjunction with other particular features, may be combined individually as well as in any combination with other features or groups of features disclosed herein, provided this has not been expressly ruled out and provided such combinations are not technically impossible or meaningless. A detailed, comprehensive description of all conceivable combinations of features has not been provided here for the sake of brevity and legibility of the description.

Whilst the invention is illustrated and described in detail in the drawings and the preceding description, this illustration and description are merely exemplary and no limitation of the scope of protection, as defined by the claims, is intended. The invention is not limited to the disclosed embodiments.

Modifications to the disclosed embodiments are obvious to a person skilled in the art from the drawings, the description and the appended claims. In the claims the word "comprise" does not exclude other elements or steps, and the indefinite article "a" or "an" does not exclude a plurality. The mere fact that some features are claimed in different claims does not mean they cannot be combined. Reference numerals in the claims are not intended to limit the scope of protection.

LIST OF REFERENCE NUMERALS

1000 grid
1100.*a*-1100.*f* network node
1100 control plane
1120 transport plane
1122 internal distributor in the transport plane
1130.*a*, 1130.*b* interface
1131.*a*, 1131.*b* power valve in the transport plane
1132 IP router in the control plane
1132.*a*, 1132.*b* functional group of the interface in the control plane
2000 power plant
3000 consumer
3100 service connection
3200 alternating voltage domestic network
3300 alternating voltage consumer/electrical appliance
3400 intelligent direct voltage domestic network
3500 direct voltage consumer/electrical appliance

The invention claimed is:

1. A method for transmitting electrical energy via an electricity grid from at least one generator for electrical energy through at least one network node to at least one consumer, wherein the electrical energy is transmitted in the form of energy packets from the generator via the network node to the consumer, using the steps:
   determining a power profile for each energy packet to be transmitted, wherein the power profile determines which power is to be maximally transmitted for the energy packet at a moment in time t;
   wherein a data packet is associated with each energy packet and is transmitted with the energy packet in such a way that when arriving at a network node the data packet arrives before the energy packet;
   wherein the power profile is transmitted as information with the data packet,
   wherein each energy packet at a network node is routed autonomously from the generator to the consumer;

wherein changes in the electricity grid are determined without any user control or a supervising instance;
wherein a synchronous absolute time is provided throughout the electricity grid; wherein time is divided into an integer multiple of an elementary time interval, and wherein the starting time of each elementary time interval is synchronous anywhere in the electricity grid providing an absolute ordering relation;
wherein the power is constant over the elementary time interval;
wherein each energy packet comprises at least one elementary time interval;
wherein routing of the energy packet comprises calculation of a path from the generator to the consumer by using a routing algorithm; and
wherein the routing comprises the steps of:
  receiving a first data packet;
  receiving a first energy packet associated with the first data packet;
  receiving a second data packet;
  receiving a second energy packet associated with the second data packet;
  determining a next element in the electricity grid to which the first energy packet is to be transmitted as a first receiver from the information contained in the first data packet;
  determining a next element in the electricity grid to which the second energy packet is to be transmitted as a second receiver from the information contained in the second data packet;
  if the first and second receivers are identical, they constitute a common receiver combining the received first and second energy packets to form an energy packet to be transmitted, wherein the first and second energy packets are transmitted simultaneously in the energy packet to be transmitted, and
  wherein the combining process includes:
    adding the power profile of the first energy packet and the power profile of the second energy packet to form a power profile TP(t) of the energy packet to be transmitted, wherein for each elementary time interval the power profile of the first energy packet and the power profile of the second energy packet are added to form the power profile of the energy packet to be transmitted in this elementary time interval, the first power packet spanning a first range of elementary time intervals, the second power packet spanning a second range of elementary time intervals, wherein the second range of elementary time intervals is different than the first range of elementary time intervals; and
  selecting a line for the transmission of the energy packet to be transmitted with the aid of the information contained in the first and second data packets;
transmitting a data packet associated with the energy packet to be transmitted to the previously determined receiver, wherein the data packet associated with the energy packet to be transmitted contains a target address of a consumer for the first energy packet, a target address of a consumer for the second energy packet, and the power profiles of the first and second energy packets; and
connecting the selected line with the aid of a power valve as a controllable switch, wherein the power valve consists of power electronics, a controller for the power electronics and a power measurement device on an output side on the selected line to the receiver and an interface to a control plane;
wherein the power valve limits a maximum power transmitted at any point in time; and
transmitting the energy packet to be transmitted, which is defined by a voltage U(t), an electric current I(t), and a duration T of the energy packet associated with the data packet to the same previously determined receiver by controlling the power transmitted at a moment in time with the aid of the power valve on the basis of a power profile TP(t) of the energy packet to be transmitted:
wherein the power valve is controlled such that the maximum power transmitted at any point in time is equal to the value of the power profile TP(t) at any point in time.

2. The method according to claim 1, wherein the data packet and the energy packet are transmitted via a single line.

3. The method according to claim 1, wherein the data packet is transmitted via a data network and the energy packet is transmitted via an electricity grid, the data network and the electricity grid being physically separate from one another.

4. The method according to claim 3, wherein the electricity grid and the data network together form a logical network which comprises a transport plane and a signalling and control plane (SCP).

5. The method according to claim 1, wherein the data packet comprises a unique addressing of the generator for electrical energy.

6. The method according to claim 1, wherein the data packet comprises a unique target addressing for the energy packet.

7. The method according to claim 1, wherein:
the power profile during any elementary time interval is defined as an integral multiple of an elementary power, wherein the elementary power is constant over the elementary time interval, and wherein the power valve is controlled such that the maximum power transmitted at any point in time is equal to an integral multiple of the elementary power; and
the energy of the energy packet is the sum of all elementary power over the duration of the energy packet.

8. The method according to claim 1, wherein a data packet is transmitted from the at least one consumer to the at least one network node to the at least one generator.

9. The method according to claim 1, wherein the method comprises a store management for an energy store associated with the at least one consumer, the store management defining at least one level mark of the energy store and then transmitting a request for energy or an offer for energy to the network when the level of the store exceeds or falls below the level mark.

10. The method according to claim 1, wherein the method comprises a power limit which defines the power which can be drawn by the at least one consumer from the network.

11. An electricity grid comprising at least one network node with means for contacting the network node to a generator and to at least one consumer;
wherein the electricity grid is designed such that changes in the electricity grid are determined without any user control or a supervising instance;
wherein the network node is designed and interconnected with the generator and the consumer in such a way that, during operation, electrical energy can be transmitted in the form of energy packets having a predetermined amount of energy from the generator, via the network node to the consumer;
wherein a power profile for each energy packet to be transmitted determines which power is to be maximally transmitted for the energy packet at a moment in time;

wherein the network node is designed and interconnected with the generator and the consumer in such a way that during operation, a data packet associated with each energy packet can be transmitted from the generator, via the network node, to the consumer;

wherein the data packet and the energy packet are transmitted in such a way that when arriving at a network node the data packet arrives before the energy packet;

wherein the power profile is transmitted as information in the data packet;

wherein a synchronous absolute time is provided throughout the electricity grid; wherein time is divided into an integer multiple of an elementary time interval, and wherein the starting time of each elementary time interval is synchronous anywhere in the electricity grid providing an absolute ordering relation;

wherein the power is constant over the elementary time interval;

wherein each energy packet comprises at least one elementary time interval; and wherein the network node for a directional transmission of the energy packet with use of the data packet comprises a device for autonomously routing and comprises:

a path finding device for calculating a path of the energy packet from the generator to the consumer using a routing algorithm;

a receiving device for receiving a first data packet and a second data packet;

a receiving device for receiving a first energy packet associated with the first data packet and a second energy packet associated with the second data packet;

a device for determining a next element in the electricity grid to which the first energy packet is to be transmitted as a first receiver from the information contained in the first data packet and for determining a next element in the electricity grid to which the second energy packet is to be transmitted as a second receiver from the information contained in the second data packet;

a device for selecting a line for the transmission of an energy packet to be transmitted with the aid of the information contained in the first data packet and in the second data packet;

a device for forming a data packet to be transmitted once the first receiver and the second receiver are identical, wherein the data packet to be transmitted contains a target address of a consumer for the first energy packet, a target address of a consumer for the second energy packet, and the power profiles of the first and second energy packets;

wherein a device for transmitting the data packet to be transmitted is connected to the device for determining the first receiver and the second receiver;

a device for forming an energy packet to be transmitted once the first receiver and the second receiver are identical, wherein the first and second energy packets are transmitted simultaneously in the energy packet to be transmitted, wherein the power profile TP(t) of the energy packet to be transmitted is formed by adding the power profile of the first energy packet and the power profile of the second energy packet, and wherein for each elementary time interval the power profile of the first energy packet and the power profile of the second energy packet are added to form the power profile of the energy packet to be transmitted in this elementary time interval, the first power packet spanning a first range of elementary time intervals, the second power packet spanning a second range of elementary time intervals, wherein the second range of elementary time intervals is different than the first range of elementary time intervals;

a device for transmitting the energy packet to be transmitted associated with the data packet to be transmitted, wherein the energy packet to be transmitted has a power profile TP(t) being defined by a voltage U(t), an electric current I(t), and an duration T; wherein the device for transmitting the energy packet to be transmitted is connected to the device for determining the first receiver and the second receiver;

wherein the network node is configured to transmit the data packet to be transmitted and the energy packet to be transmitted to the same receiver during operation; and wherein the device for transmitting the energy packet to be transmitted comprises at least one power valve as a controllable switch which is connected to the device for transmitting the data packet to be transmitted, wherein the power valve is controllable in order to limit the maximum power transmitted of the energy packet to be transmitted at any point in time;

wherein the power valve consists of power electronics, a controller for the power electronics, and a power measurement device of an output side of the selected line to the receiver and an interface to a control plane; and wherein the power valve is controlled such that the maximum power transmitted at any point in time is equal to the value of the power profile TP(t) at any point in time.

12. The network node according to claim 11, wherein the network node is connected to a first physical network for transmission of the energy packet, and to a second physical network for transmission of the data packet.

13. The network node according to claim 11, wherein the network node comprises a transport plane and a signalling and control plane (SCP).

14. The electricity grid according to claim 11, wherein the at least one network node forms a virtual power plant, wherein this network node is connected to a plurality of generators and appears to the at least one consumer as a single generator.

15. The electricity grid according to claim 11, wherein the generator, the network node, or the consumer selectively or combinatorily comprise a store for electricity.

16. A non-transitory machine-readable data carrier comprising a computer program stored thereon according claim 1.

17. The electricity grid according to claim 11, wherein:
the power profile during any elementary time interval is defined as an integral multiple of an elementary power, wherein the elementary power is constant over the elementary time interval, and wherein the power valve is controlled such that the maximum power transmitted at any point in time is equal to an integral multiple of the elementary power; and
the energy of the energy packet is the sum of all elementary power over the duration of the energy packet.

18. A method for transmitting electrical energy via an electricity grid from at least one generator for electrical energy through at least one network node to at least one consumer, wherein the electrical energy is transmitted in the form of energy packets from the generator via the network node to the consumer, using the steps:
determining a power profile for each energy packet to be transmitted, wherein the power profile determines which power is to be maximally transmitted for the energy packet at a moment in time t,
wherein a data packet is associated with each energy packet and is transmitted with the energy packet in such a way that when arriving at a network node the data packet arrives before the energy packet, wherein the power profile is transmitted as information with the data packet, wherein each energy packet at a network node is routed autonomously from the generator to the consumer, wherein changes in the electricity grid are determined without any user control or a supervising instance; wherein routing of the energy packet comprises calculation of a path from the generator to the consumer by using a routing algorithm;

wherein a synchronous absolute time is provided throughout the electricity grid; wherein time is divided into an integer multiple of an elementary time interval, and wherein the starting time of each elementary time interval is synchronous anywhere in the electricity grid providing an absolute ordering relation;

wherein the power is constant over the elementary time interval;

wherein each energy packet comprises at least one elementary time interval; and wherein the routing comprises the steps of:
receiving the data packet containing information regarding a target address of a first consumer, a target address of a second consumer, a first power profile of a first energy packet and a second power profile of a second energy packet, wherein the first energy packet and the second energy packet are to be transmitted simultaneously;

receiving the energy packet associated with the data packet;

determining a next element in the electricity grid to which the first energy packet is to be transmitted as a first receiver from the information contained in the data packet;

determining a next element in the electricity grid to which the second energy packet is to be transmitted as a second receiver from the information contained in the data packet;

if the first and second receivers are not identical, breaking down the energy packet received into a first energy packet and a second energy packet to be transmitted, wherein for each elementary time interval the sum of the power profile of the first energy packet and the power profile of the second energy packet equals the power profile of the energy packet received in this elementary time interval, the first power packet spanning a first range of elementary time intervals, the second power packet spanning a second range of elementary time intervals, wherein the second range of elementary time intervals is different than the first range of elementary time intervals, and wherein the process of breaking down the energy packet received includes:

selecting a first line for the transmission of the first energy packet to be transmitted with the aid of the information contained in the data packet received; and selecting a second line for the transmission of the second energy packet to be transmitted with the aid of the information contained in the data packet received;

transmitting a first data packet associated with the first energy packet to be transmitted to the previously determined first receiver, wherein the first data packet contains the target address of the first consumer and the power profile of the first energy packet;

transmitting a second data packet associated with the second energy packet to be transmitted to the previously determined second receiver, wherein the second data packet contains the target address of the second consumer and the power profile of the second energy packet;

connecting the selected first line with the aid of a first power valve as a controllable switch;

wherein the first power valve consists of power electronics, a controller for the power electronics and a power measurement device on an output side on the selected line to the first receiver and an interface to a control plane, wherein the first power valve limits a maximum power transmitted at any point in time;

connecting the selected second line with the aid of a second power valve as a controllable switch;

wherein the second power valve consists of power electronics, a controller for the power electronics and a power measurement device on an output side on the selected line to the second receiver and an interface to a control plane;

wherein the second power valve limits a maximum power transmitted at any point in time;

transmitting the first energy packet to be transmitted, which is defined by a voltage U(t), an electric current I(t), and a duration T of the first energy packet associated with the first data packet to the previously determined first receiver by controlling the power transmitted at a moment in time with the aid of the first power valve on the basis of the power profile TP(t) of the first energy packet to be transmitted; and transmitting the second energy packet to be transmitted, which is defined by a voltage U(t), an electric current I(t) and a duration T of the packet, associated with the second data packet to the previously determined second receiver by controlling the power transmitted at a moment in time, with the aid of the second power valve, on the basis of the power profile TP(t) of the second energy packet to be transmitted;

wherein transmission of the first energy packet and the second energy packets occurs simultaneously;

wherein the first power valve is controlled such that the maximum power transmitted at any point in time is equal to the value of the first power profile TP(t) at any point in time; and wherein the second power valve is controlled such that the maximum power transmitted at any point in time is equal to the value of the second power profile TP(t) at any point in time.

19. The method according to claim 18, wherein:
the power profile during any elementary time interval is defined as an integral multiple of an elementary power, wherein the elementary power is constant over the elementary time interval, and wherein the power valve is controlled such that the maximum power transmitted at any point in time is equal to an integral multiple of the elementary power; and the energy of the energy packet is the sum of all elementary power over the duration of the energy packet.

20. An electricity grid comprising at least one network node with means for contacting the network node to a generator and to at least one consumer;

wherein the electricity grid is designed such that changes in the electricity grid are determined without any user control or a supervising instance;

wherein the network node is designed and interconnected with the generator and the consumer in such a way that, during operation, electrical energy can be transmitted in the form of at least one energy packet having a predetermined amount of energy from the generator, via the network node to the consumer;

wherein a power profile for each energy packet to be transmitted determines which power is to be maximally transmitted for the energy packet at a moment in time;

wherein the network node is designed and interconnected with the generator and the consumer in such a way that during operation, a data packet associated with each energy packet can be transmitted from the generator, via the network node, to the consumer;

wherein each data packet and each energy packet are transmitted in such a way that when arriving at a network node the data packet arrives before the energy packet;

wherein the power profile is transmitted as information in the data packet;

wherein a synchronous absolute time is provided throughout the electricity grid; wherein time is divided into an integer multiple of an elementary time interval, and wherein the starting time of each elementary time interval is synchronous anywhere in the electricity grid providing an absolute ordering relation;

wherein the power is constant over the elementary time interval;

wherein each enemy packet comprises at least one elementary time interval; and wherein the network node for a directional transmission of the energy packet with use of the data packet comprises a device for autonomously routing and comprises:

a path finding device for calculating a path of the energy packet from the generator to the consumer using a routing algorithm;

a receiving device for receiving the data packet containing information regarding a target address of a first consumer, a target address of a second consumer, a first power profile of a first energy packet and a second power profile of a second energy packet, wherein the first energy packet and the second energy packet are to be transmitted simultaneously;

a receiving device for receiving the energy packet associated with the data packet;

a device for determining a next element for the first energy packet to be transmitted as a first receiver and a next element for the second energy packet to be transmitted as a second receiver from the information contained in the data packet;

a device for selecting a first line for the transmission of the first energy packet and for selecting a second line for the transmission of the second energy packet with the aid of the information contained in the data packet;

wherein a device for transmitting the data packet is connected to the device for determining the receiver;

a first device for transmitting the first energy packet associated with a first data packet having a power profile TP(t) being defined by a voltage U(t), an electric current I(t), and a duration T;

a second device for transmitting the first energy packet associated with a first data packet having a power profile TP(t) being defined by a voltage U(t), an electric current I(t), and a duration, wherein the first device for transmitting the first energy packet and the second device for transmitting the second energy packet are connected to the device for determining the first and second receivers;

wherein for each elementary time interval the sum of the power profile of the first enemy packet and the power profile of the second enemy packet equals the power profile of the enemy packet received in this elementary time interval, the first power packet spanning a first range of elementary time intervals, the second power packet spanning a second range of elementary time intervals, wherein the second range of elementary time intervals is different than the first range of elementary time intervals, and wherein the network node is configured to transmit the first data packet and the first energy packet to the same first receiver and to transmit the second data packet and the second energy packet to the same second receiver during operation;

wherein the first device for transmitting the first energy packet comprises at least one first power valve as a controllable switch which is connected to the device for transmitting the first and second data packets such that it is controllable in order to limit the maximum power transmitted of the first energy packet at any given point in time t according to the power profile TP(t) of the first energy packet to be transmitted;

wherein the second device for transmitting the second energy packet comprises at least one second power valve as a controllable switch which is connected to the device for transmitting the first and second data packets such that it is controllable in order to limit the maximum power transmitted of the second energy packet at any given point in time t according to the power profile TP(t) of the second energy packet to be transmitted;

wherein the first power valve consists of power electronics, a controller for the power electronics and a power measurement device on an output side on the selected first line to the first receiver and an interface to a control plane;

wherein the first power valve is controlled such that the maximum power transmitted at any point in time is equal to the value of the power profile TP(t) of the first energy packet at any point in time;

wherein the second power valve consists of power electronics, a controller for the power electronics and a power measurement device on an output side of the selected second line to the second receiver and an interface to a control plane; and wherein the second power valve is controlled such that the maximum power transmitted at any point in time is equal to the value of the power profile TP(t) of the second energy packet at any point in time.

21. The electricity grid according to claim 20, wherein:

the power profile during any elementary time interval is defined as an integral multiple of an elementary power, wherein the elementary power is constant over the elementary time interval, and wherein the power valve is controlled such that the maximum power transmitted at any point in time is equal to an integral multiple of the elementary power; and the energy of the energy packet is the sum of all elementary power over the duration of the energy packet.

* * * * *